(12) United States Patent
Motomiya et al.

(10) Patent No.: US 10,717,389 B2
(45) Date of Patent: Jul. 21, 2020

(54) ELECTRIC RETRACTABLE VIEW DEVICE FOR VEHICLE

(71) Applicant: MURAKAMI CORPORATION, Shizuoka (JP)

(72) Inventors: Masahiro Motomiya, Fujieda (JP); Kenji Ichikawa, Shizuoka (JP); Takayuki Miyazaki, Fujieda (JP); Mizuki Toyama, Kakegawa (JP)

(73) Assignee: MURAKAMI CORPORATION, Shizuoka (JP)

( * ) Notice: Subject to any disclaimer, the term of this patent is extended or adjusted under 35 U.S.C. 154(b) by 385 days.

(21) Appl. No.: 15/560,825

(22) PCT Filed: Mar. 18, 2016

(86) PCT No.: PCT/JP2016/058739
§ 371 (c)(1),
(2) Date: Sep. 22, 2017

(87) PCT Pub. No.: WO2016/158506
PCT Pub. Date: Oct. 6, 2016

(65) Prior Publication Data
US 2018/0111558 A1    Apr. 26, 2018

(30) Foreign Application Priority Data
Mar. 31, 2015 (JP) ................. 2015-071291

(51) Int. Cl.
*B60R 1/074* (2006.01)
*B60R 1/072* (2006.01)
(Continued)

(52) U.S. Cl.
CPC .............. *B60R 1/074* (2013.01); *B60R 1/072* (2013.01); *G02B 7/1827* (2013.01); *H02K 7/1166* (2013.01); *H02K 11/38* (2016.01)

(58) Field of Classification Search
CPC ........ B60R 1/072; B60R 1/074; G02B 7/1827
(Continued)

(56) References Cited

U.S. PATENT DOCUMENTS 4,832,477 A * 5/1989 Toni ........................ B60R 1/074
248/478
5,594,590 A * 1/1997 Ishiyama ................ B60R 1/074
359/841
(Continued)

FOREIGN PATENT DOCUMENTS

| CN | 1213346 | 4/1999 |
|----|---------|--------|
| CN | 1383407 | 12/2002 |

(Continued)

OTHER PUBLICATIONS

Search Report issued in PCT/JP2016/058739 dated Jun. 28, 2016, and English langauge translation thereof.
(Continued)

*Primary Examiner* — Ricky D Shafer
(74) *Attorney, Agent, or Firm* — Greenblum & Bernstein, P.L.C.

(57) ABSTRACT

This invention intends to enhance motor holding performance of a motor holding member in an electric retractable view device for a vehicle. An electric retracting unit includes a rotating body. The rotating body includes an outer plate (motor holding member) that holds a motor body of a motor. The outer plate includes a barrel and a claw engagement piece. The barrel receives the motor body in an inner space. The claw engagement piece engages with a rear end face (engaged portion) of the motor body received in the barrel and locks the motor so as to prevent axial movement. An engagement surface of the engagement claw of the claw
(Continued)

engagement piece is disposed at a position on a deeper side of the inner space relative to an open end of the inner space of the barrel.

8 Claims, 14 Drawing Sheets

(51) Int. Cl.
*G02B 7/182* (2006.01)
*H02K 7/116* (2006.01)
*H02K 11/38* (2016.01)

(58) Field of Classification Search
USPC .................................................. 359/841, 877
See application file for complete search history.

(56) References Cited

U.S. PATENT DOCUMENTS

| | | | |
|---|---|---|---|
| 5,684,646 A | 11/1997 | Boddy | |
| 5,703,731 A | 12/1997 | Boddy et al. | |
| 5,703,732 A | 12/1997 | Boddy et al. | |
| 6,543,902 B2 * | 4/2003 | Bohm | B60R 1/07 248/900 |
| 6,679,610 B2 | 1/2004 | Yamauchi | |
| 7,488,081 B2 * | 2/2009 | Yoshida | B60R 1/074 359/841 |
| 7,533,997 B2 * | 5/2009 | Onuki | B60R 1/074 359/841 |
| 8,567,967 B2 * | 10/2013 | Hwang | B60R 1/074 359/841 |
| 2002/0105740 A1 | 8/2002 | Yamauchi | |
| 2002/0130241 A1 * | 9/2002 | Yoshida | B60R 1/06 248/476 |
| 2007/0092368 A1 | 4/2007 | Yoshida et al. | |
| 2008/0297927 A1 * | 12/2008 | Onuki | B60R 1/074 359/841 |
| 2018/0105112 A1 * | 4/2018 | Motomiya | B60R 1/074 |
| 2018/0105113 A1 * | 4/2018 | Motomiya | B60R 1/074 |
| 2018/0111557 A1 * | 4/2018 | Motomiya | B60R 1/074 |
| 2018/0281682 A1 * | 10/2018 | Ichikawa | B60R 1/074 |
| 2018/0287454 A1 * | 10/2018 | Motomiya | B60R 1/074 |

FOREIGN PATENT DOCUMENTS

| | | |
|---|---|---|
| CN | 1948051 | 4/2007 |
| JP | 58-34338 | 3/1983 |
| JP | 2011-5915 | 1/2011 |
| JP | 2013-67278 | 4/2013 |

OTHER PUBLICATIONS

Written Opinion of the Internataional Searching Authority issued in PCT/JP2016/058739 dated Jun. 28, 2016, and English langauge translation thereof.

Office Action issued in China Counterpart Patent Appl. No. 201680020277.8, dated Aug. 5, 2019, along with an English translation thereof.

* cited by examiner

ELECTRIC RETRACTABLE VIEW DEVICE FOR VEHICLE

The disclosure of Japanese Patent Application No. JP2015-071291 filed on Mar. 31, 2015 including the specification, drawings, claims and abstract is incorporated herein by reference in its entirety.

TECHNICAL FIELD

This invention relates to an electric retractable view device for a vehicle such as an electric retractable mirror for a vehicle or an electric retractable camera for a vehicle, the electric retractable view device delivering enhanced motor holding performance.

BACKGROUND ART

Electric retractable door mirrors for a vehicle generally have the following configuration. A shaft is provided upright on the vehicle body side. A rotating body is supported by the shaft so as to be rotatable in a direction around an axis of the shaft. In the rotating body, e.g., a motor is mounted. A power transmission mechanism is disposed between the rotating body and the shaft. In an electric retractable door mirror having such configuration as above, a driving force of the motor is transmitted to the shaft via the power transmission mechanism. Consequently, the rotating body is reversibly rotated in the direction around the axis of the shaft. In this way, electric retracting/extending operation of the rotating body is performed. Examples of the conventional electric retractable door mirrors include one described in Patent Literature 1. The electric retractable door mirror includes a motor holding structure including a barrel and claw engagement pieces. Each claw engagement piece includes a leg and an engagement claw disposed on a free end side of the leg so as to face an inner space side of the barrel. The barrel includes the inner space that receives a motor body. The motor body is made to enter the inner space from an open end of the inner space, with the side on which a motor shaft protrudes as the top side, and received in the inner space. The engagement claws of the claw engagement pieces engage with a step at a rear of the motor body received in the barrel and thereby lock the motor to prevent axial movement thereof.

CITATION LIST

Patent Literature

Patent Literature: Japanese Patent Laid-Open No. 2013-067278

SUMMARY OF INVENTION

Technical Problem

According to the motor holding structure described in Patent Literature 1, when the motor is made to enter the inner space of the barrel from the open end of the inner space to assemble the motor to the barrel, the motor may be made to enter the inner space of the barrel in such a manner that an axis of the motor is largely displaced or largely inclined relative to the barrel. Such entry causes the claw engagement pieces to be largely bent and plastically deformed toward the outside of the barrel by the motor body, which may result in decrease in motor holding performance of the claw engagement pieces.

This invention is intended to provide an electric retractable view device for a vehicle, the electric retractable view device delivering enhanced motor holding performance.

Solution to Problem

An electric retractable view device for a vehicle according to this invention includes: a shaft provided upright on a vehicle body side; a rotating body supported by the shaft so as to be rotatable in a direction around an axis of the shaft; a motor mounted in the rotating body; and a power transmission mechanism that transmits a driving force of the motor to the shaft to rotate the rotating body in the direction around the axis of the shaft, and the rotating body includes a motor holding member that holds a motor body of the motor, the motor holding member includes a barrel and a claw engagement piece, the barrel includes an inner space that receives the motor body and an open end of the inner space, and the barrel has a configuration that causes the motor body to enter the inner space from the open end, with a side on which a motor shaft protrudes as a top side, and be thereby received in the inner space and causes rotation of the motor shaft to be output to an outside of the inner space, the claw engagement piece includes a leg disposed so as to face the inner space, the leg including a fixed end disposed on a deep side in an axis direction of the inner space of the barrel and a free end disposed on the open end side, and an engagement claw disposed at the leg so as to face the inner space side, and the claw engagement piece has a configuration that causes an engagement surface of the engagement claw to be engaged with an engaged portion of the motor body received in the barrel to lock the motor so as to prevent axial movement, and the engagement surface of the engagement claw is disposed at a position on a deeper side of the inner space relative to the open end of the inner space. Accordingly, since the engagement surface of the engagement claw is disposed at a position on a deeper side of the inner space relative to the open end of the inner space (in other words, the open end of the inner space is disposed on the side close to the motor approaching the open end to enter the inner space, relative to the engagement surface of the engagement claw), the barrel can promptly support the motor body entering the inner space when the motor is made to enter the inner space of the barrel from the open end of the inner space and thereby is assembled to the barrel. In other words, compared to a case where an engagement surface is disposed at a position that is the same as that of the open end of the inner space or a position on the outer side of the inner space relative to the open end, a timing of the barrel starting supporting the motor body can be advanced relative to a timing of the motor body starting bending the claw engagement piece.

Consequently, before the motor body largely bends the claw engagement piece toward the outside of the barrel, a position of the motor body relative to the barrel can be adjusted. As a result, the claw engagement piece is prevented from being largely bent and plastically deformed toward the outside of the barrel by the motor body, enabling enhancement in motor holding performance of the claw engagement piece.

In this invention, it is possible that: the barrel includes two cutouts at two positions in a circumferential direction of the barrel, the cutouts being formed in communication with the open end of the inner space; and the claw engagement piece includes a part of the barrel, the part being circumferentially separated from the barrel by the two cutouts, as the leg. Accordingly, the claw engagement piece can be formed by a circumferential part of the barrel.

In this invention, it is possible that a distal end of the free end of the claw engagement piece is disposed at a position aligned with the open end of the inner space or a position on a deeper side of the inner space relative to the open end. Accordingly, the barrel can promptly support the motor body entering the inner space when the motor is made to enter the inner space of the barrel from the open end of the inner space and thereby is assembled to the barrel. Consequently, the claw engagement piece is more reliably prevented from being largely bent and plastically deformed toward the outside of the barrel by the motor body, enabling further enhancement in motor holding performance of the claw engagement piece.

In this invention, it is possible that: the rotating body includes a cover put on the motor holding member, and the cover includes a retainer at an inner circumferential surface of the cover, the retainer being in abutment with the claw engagement piece and thereby locking the claw engagement piece so as to prevent spreading toward an outside of the barrel. Accordingly, upon the cover being put on the motor holding member in a state in which the motor is held in the motor holding member, the retainer of the cover locks the claw engagement piece so as to prevent spreading toward the outside of the barrel. Therefore, disengagement between the claw engagement piece and the motor body is prevented, enabling the motor to be more reliably held in the motor holding member.

In this invention, it is possible that a width of the leg of the claw engagement piece is larger than a width of the engagement claw of the claw engagement piece in a circumferential direction of the motor body. Accordingly, stiffness of the leg is enhanced, enabling further enhancement in motor holding performance.

In this invention, it is possible that: a width of the leg of the claw engagement piece is larger than a width of the engagement claw of the claw engagement piece in a circumferential direction of the motor body; the engagement claw of the claw engagement piece is disposed in a center in the width direction of the leg; and the leg includes an opening in a surface of the leg, the opening being located at a position at which the opening faces the engagement surface. Accordingly, an undercut surface forming the engagement surface of the claw engagement piece can be formed by inserting a slide core to a position at which the leg of the claw engagement piece is to be formed, avoiding an opening resulting from insertion of a slide core from being provided in a bottom of the barrel. Therefore, no opening resulting from the insertion of the slide core is formed in the bottom of the barrel, the bottom supporting a distal end face of the motor body (surface from which the motor shaft protrudes), and thus, e.g., water and/or grease can be prevented from running in/out between the inner space of the barrel and a space outside the bottom of the barrel through the opening. Consequently, occurrence of failures in the motor received in the inner space of the barrel and/or components and the like disposed on the space outside of the bottom of the barrel can be prevented.

DESCRIPTION OF EMBODIMENT

Figure 2:
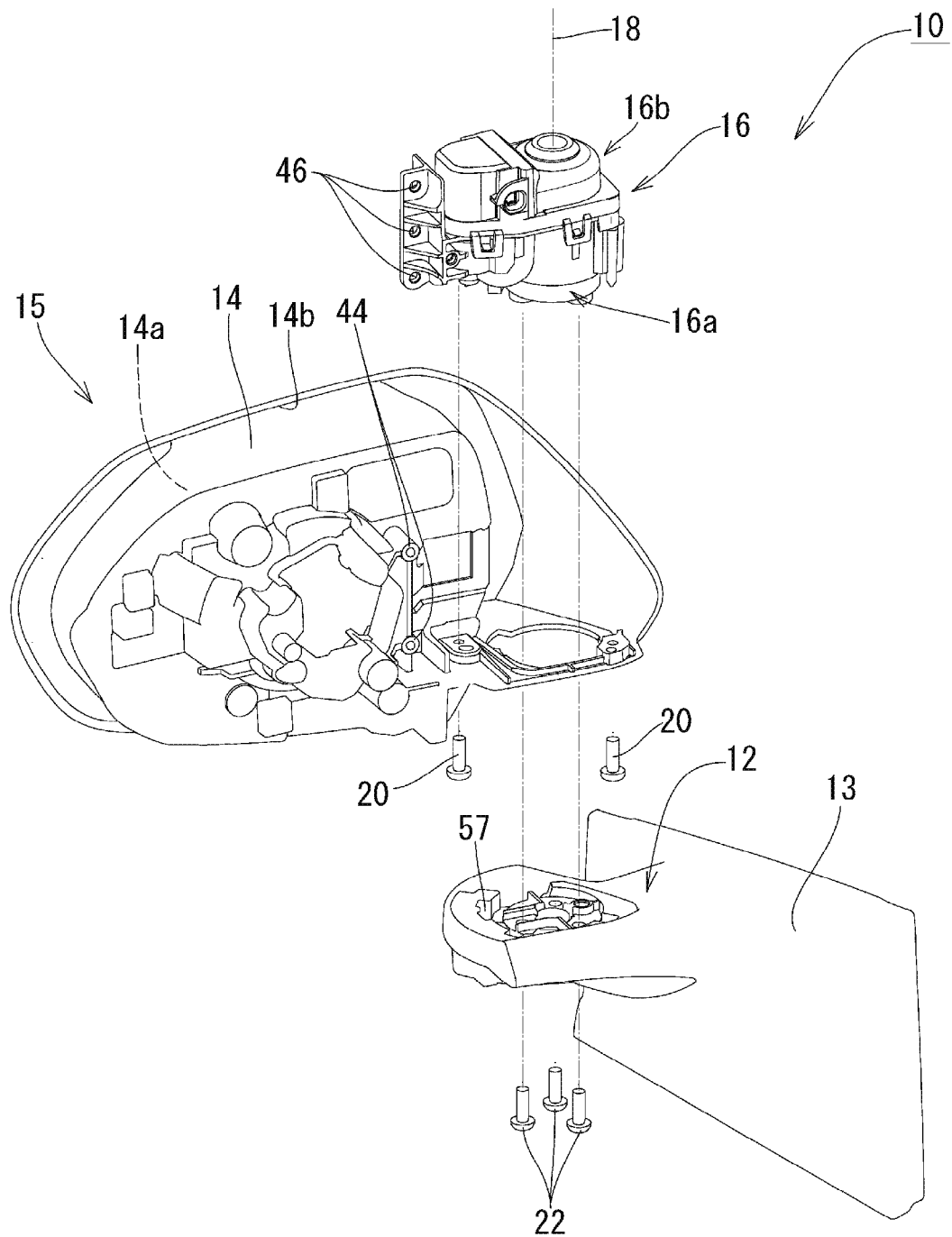
FIG. 2 is an exploded perspective view of an electric retractable door mirror for the right side of a vehicle according to an embodiment of this invention.

An embodiment of this invention will be described. FIG. 2 is an exploded perspective view of an electric retractable door mirror for the right side of a vehicle, to which this invention is applied. FIG. 2 illustrates a state of a mirror rotating section 15 in an extended position as viewed from the back side (vehicle front side). Also, in FIG. 2, illustration of, e.g., a mirror surface adjustment actuator and a mirror plate both disposed in a front opening 14*a* of a visor 14 and a housing cover (reference numeral 17 in FIG. 6) fitted on the back side of the visor 14 is omitted. This door mirror 10 includes a mirror base 12, the mirror rotating section 15, and an electric retracting unit 16 connected between the mirror base 12 and the mirror rotating section 15. The mirror rotating section 15 includes the visor 14. The mirror base 12 is provided so as to protrude from a vehicle body (right door) 13 to the right of the vehicle. The electric retracting unit 16 includes a fixed body 16a in a lower part and a rotating body 16b in an upper part. The rotating body 16b is rotatable relative to the fixed body 16a in a direction around a rotation axis 18. The rotating body 16b of the electric retracting unit 16 is fixed to the back side of the visor 14 by screwing two screws 20 into the rotating body 16b of the electric retracting unit 16 from a lower surface of the visor 14. In a state in which the rotating body 16b is fixed to the visor 14, the fixed body 16a of the electric retracting unit 16 is fixed to the mirror base 12 by screwing three screws 22 into the fixed body 16a of the electric retracting unit 16 from a lower surface of the mirror base 12. Consequently, the mirror rotating section 15 including the visor 14 is attached to and thereby supported on the mirror base 12 via the electric retracting unit 16 so as to be rotatable in the direction around the rotation axis 18. The housing cover (reference numeral 17 in FIG. 6) not illustrated in FIG. 2 is fitted to a back surface of the visor 14.

Consequently, an opening 14b in the back surface of the visor 14 is occluded by the housing cover 17, and as a result, the electric retracting unit 16 is housed in a space surrounded by the visor 14 and the housing cover 17. The mirror rotating section 15 rotates upon being electrically driven by the electric retracting unit 16 and is movable alternatively to a retracted position and the extended position. Also, the mirror rotating section 15 is movable from the retracted position to a forward-tilted position through the extended position and vice versa upon being rotated by an external force.

Figure 3:
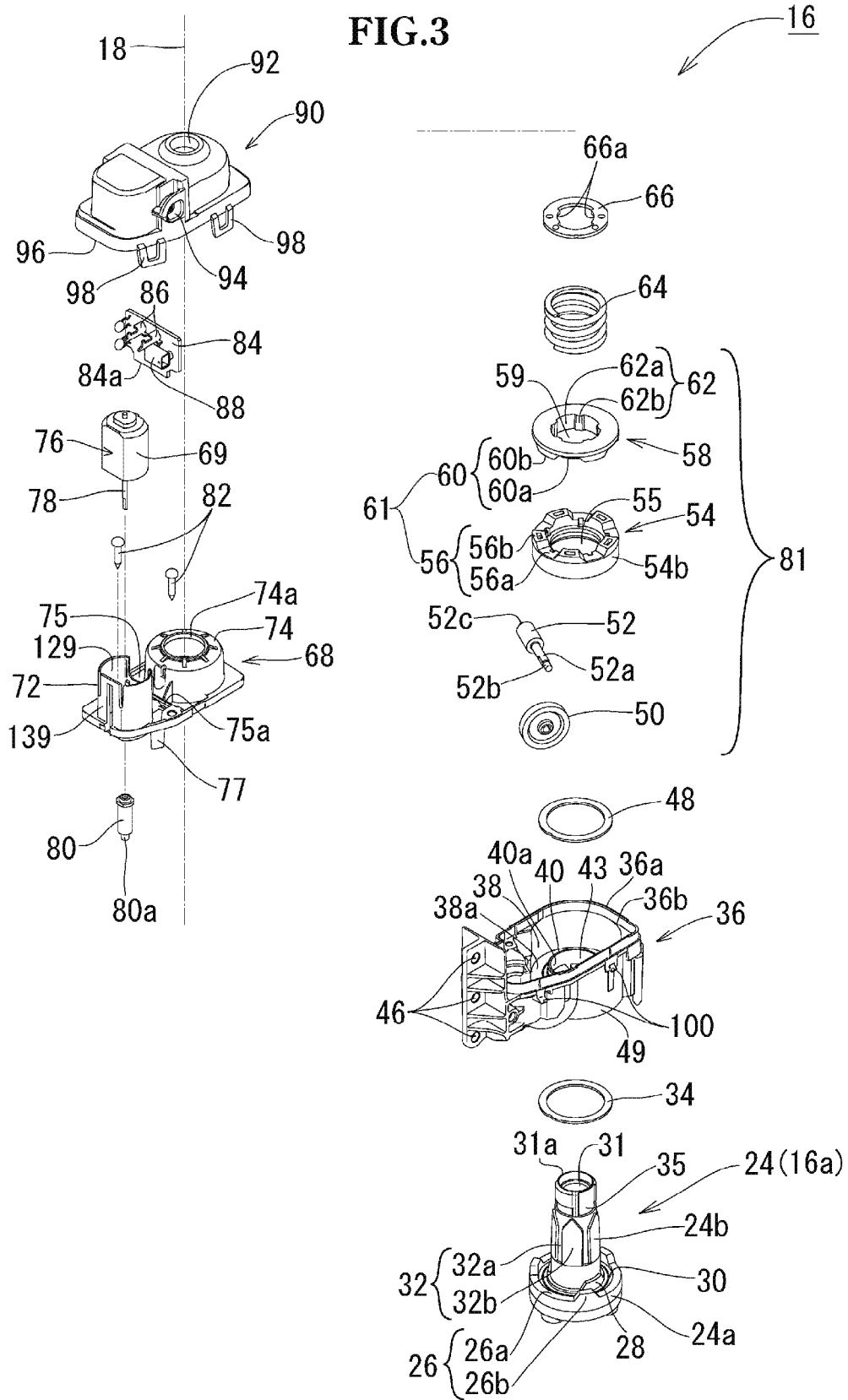
FIG. 3 is an exploded perspective view of the electric retracting unit 16 illustrated in FIG. 2.

An overall configuration of the inside of the electric retracting unit 16 will be described mainly with reference to FIG. 3. All of the components in FIG. 3 are detachably assembled into the electric retracting unit 16. The electric retracting unit 16 includes a shaft 24 forming the fixed body 16a. The shaft 24 is formed of an integrally-molded product of a reinforced resin such as PA+GF resin (glass fiber-reinforced polyamide resin). The shaft 24 coaxially includes a shaft base 24a having a large diameter and a disk-like shape in a lower part and a shaft axle 24b having a small diameter and a cylindrical shape in an upper part. The shaft 24 is provided upright so as to be orthogonal to the mirror base 12 by fixing a lower surface of the shaft base 24a to the mirror base 12 via the screws 22 (FIG. 2). A crest-valley repeated shape 26 is formed at an outermost circumferential position in an upper surface of the shaft base 24a. The crest-valley repeated shape 26 is formed of three sets of a crest 26b and a valley 26a alternately arranged in a direction around the axis of the shaft 24, the sets being each arranged with an angle of 120 degrees. A circumferential length (angle) of one valley 26a is longer than a circumferential length (angle) of one crest 26b. Also, two height maintaining protrusions 28 are formed at respective innermost circumferential positions in the upper surface of the shaft base 24a. These two height maintaining protrusions 28 are disposed so as to be spaced 180 degrees in the direction around the axis of the shaft 24 from each other and are connected to an outer circumferential surface of the shaft axle 24b. Top surfaces of the height maintaining protrusions 28 and top surfaces of height maintaining protrusions 41 of a later-described frame 36 are in abutment with and slide on each other when the mirror rotating section 15 is moved from the extended position toward the forward-tilted position by an external force. The abutment and sliding between the top surfaces causes the height maintaining protrusions 28 to maintain a height of the frame 36 relative to the shaft 24 and thereby enable the mirror rotating section 15 to be electrically returned from the forward-tilted position to the extended position. Also, a bearing surface 30 is formed at a radial position between the crest-valley repeated shape 26 at the outermost circumferential position and the height maintaining protrusions 28 at the innermost circumferential position in the upper surface of the shaft base 24a. The bearing surface 30 is formed so as to have a groove shape having a constant width, have an annular shape in the direction around the axis of the shaft 24 and be flat. A resin washer 34 is placed and received in the groove of the bearing surface 30. A hollow 31 of the shaft axle 24b is provided so as to extend through the shaft base 24a. A non-illustrated wire harness (external electric power supply wiring) that supplies electric power to, e.g., the electric retracting unit 16 and the mirror surface adjustment actuator is inserted through the hollow 31. A rotation preventing shape 32 is formed at the outer circumferential surface of the shaft axle 24b. The rotation preventing shape 32 includes five sets of a rotation preventing recess 32a and a rotation preventing projection 32b arranged alternately circumferentially, the sets being each arranged with a same circumferential length. The respective rotation preventing recesses 32a and the respective rotation preventing projections 32b are configured so as to extend in the axis direction of the shaft 24. An upper end of each rotation preventing recess 32a opens upward in order to allow entry of a corresponding rotation preventing projection (a rotation preventing projection 62b formed on an inner circumferential surface of a later-described clutch plate 58) to be fitted in the rotation preventing recess 32a. In an outer circumferential surface of an upper part of the shaft axle 24b, grooves 35 for allowing a later-described metal plate 66 to be put onto the upper part of the shaft axle 24b and to be rotated and to be held at the upper part of the shaft axle 24b are formed.

Figure 4:
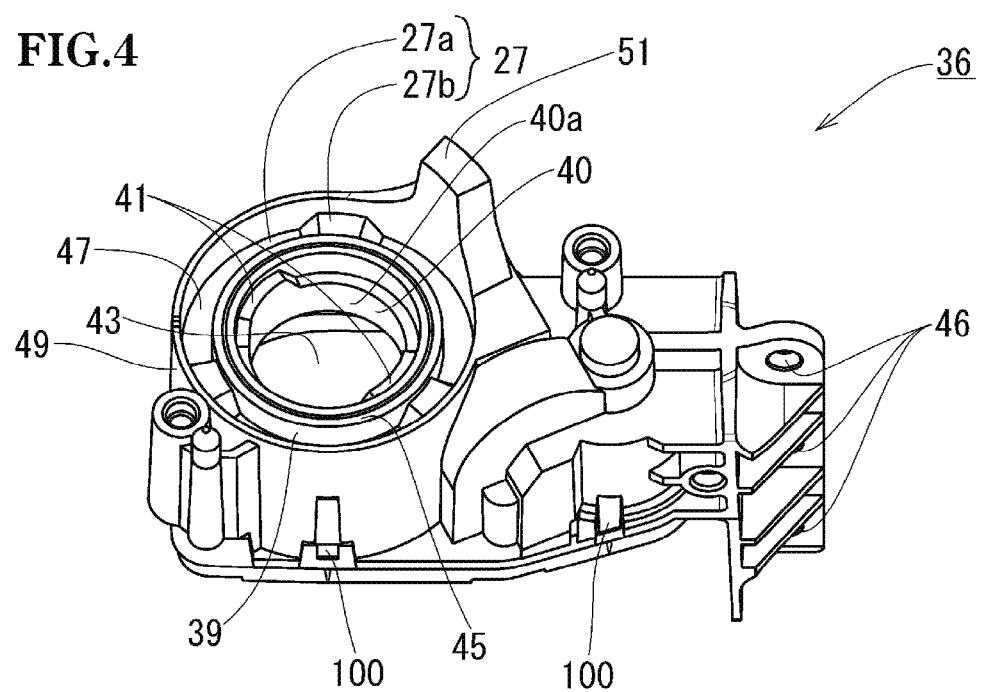
FIG. 4 is a perspective view of the frame 36 illustrated in FIG. 3 as viewed from the bottom side.

The frame 36 (which forms a casing of the rotating body 16b jointly with a later-described seal cap 90) of the rotating body 16b is rotatably supported on the shaft 24. The frame 36 is formed of an integrally-molded product of a reinforced resin such as PA+GF resin. The frame 36 includes an inner space 38 that opens upward. At a bottom surface 38a of the inner space 38, a cylinder 40 is provided upright. A hollow 43 of the cylinder 40 extends through the bottom surface 38a. Here, the referenced drawing will temporarily be moved from FIG. 3 to FIG. 4 to describe a configuration of a lower surface of the frame 36. On the lower surface of the frame 36, a cylinder 39 is provided so as to protrude downward (upward in FIG. 4). The cylinder 39 is disposed coaxially with the cylinder 40. Also, the cylinder 39 is larger in diameter and thickness than the cylinder 40. On an inner circumferential surface of the cylinder 39, two height maintaining protrusions 41 are formed. These two height maintaining protrusions 41 are disposed so as to be spaced 180 degrees in a direction around an axis of the cylinder 39 from each other and are connected to the inner circumferential surface of the cylinder 39. The top surfaces of the two height maintaining protrusions 41 and the top surfaces of the two height maintaining protrusions 28 (FIG. 3) of the shaft base 24a are in abutment with and slide on each other. An inner circumferential surface of each height maintaining protrusion 41 is located at a same radial position as the inner circumferential surface 40a of the cylinder 40, and both inner circumferential surfaces form a continuous surface. The height maintaining protrusions 28, 41 are located at a same radial position. A lower end face of the cylinder 39 forms a bearing surface 45 that faces the bearing surface 30 of the shaft 24. On the outer side of the cylinder 39, an outer barrel 49 is disposed coaxially with the cylinder 39 with a void 47 therebetween. Inside the void 47, a crest-valley repeated shape 27 to be fitted to the crest-valley repeated shape 26 (FIG. 3) in the upper surface of the shaft base 24a is formed. The crest-valley repeated shape 27 is formed of three sets of a crest 27b and a valley 27a alternately arranged in the direction around the axis of the cylinder 39, the sets being each arranged with an angle of 120 degrees. A circumferential length (angle) of one valley 27a is longer than a circumferential length (angle) of one crest 27b. Each crest 27b is disposed so as to be connected to an outer circumferential surface of the cylinder 39, an inner circumferential surface of the outer barrel 49 and a bottom surface of the void 47. In a partial circumferential area of the outer barrel 49, a stopper 51 is formed so as to protrude downward (upward in FIG. 4). The stopper 51 is inserted to a stopper groove 57 (FIG. 2) formed in the mirror base 12 so as to be movable circumferentially, and thus sets a maximum rotation range (from the retracted position to the forward-tilted position) of the mirror rotating section 15. The shaft axle 24b is inserted to a continuous hollow 43 of the cylinders 39, 40 of the frame 36 from the cylinder 39 side. At this time, the bearing surface 45 of the frame 36 is bearing-supported by the bearing surface 30 of the shaft 24 with the resin washer 34 therebetween. Also, the inner circumferential surface 40a of the cylinder 40 on the upper side is rotatably supported by the shaft axle 24b. Consequently, the frame 36 is supported by the shaft 24 so as to be rotatable in the direction around the axis of the shaft 24. The crests 26b of the crest-valley repeated shape 26 of the shaft 24 enters the void 47 in a bottom of the frame 36. In this state, the crest-valley repeated shape 26 and the crest-valley repeated shape 27 fitted together so as to be slidable on each other in both rotation directions within a predetermined angle range.

In other words, the crest-valley repeated shape 26 and the crest-valley repeated shape 27 can slide on each other in both rotation directions until an inclined surface of a boundary between each crest 26b and the corresponding valley 26a and an inclined surface of a boundary between each crest 27b and the corresponding valley 27a are brought into abutment with and thereby locked by each other (or, retracting direction, until the stopper 51 is locked by one end of the stopper groove 57). This sliding allows the mirror rotating section 15 (FIG. 2) to rotate between the retracted position and the extended position. Also, when an external force directed to the front side of the vehicle, the external force having a predetermined value or more, is applied to the mirror rotating section 15 in the extended position, the crests 26b and the crests 27b mutually slide up on the inclined surfaces of the respective opposite crests against a biasing force of a later-described coil spring 64 and move onto the top surfaces of the respective opposite crests, whereby the fit between the crest-valley repeated shape 26 and the crest-valley repeated shape 27 is cancelled. The cancellation of the fit allows the mirror rotating section 15 to rotate to the forward-tilted position. On one side of the frame 36, screw through holes 46 for screw-fastening and thereby fixing the frame 36 to bosses 44 (FIG. 2) provided at two, upper and lower, positions in the back surface of the visor 14 are formed. In this embodiment, the screw through holes 46 are provided at three, upper, intermediate and lower, positions. From among the screw through holes 46, screws (not illustrated) are inserted to the screw through holes 46 at the two, upper and lower, positions and screwed into the bosses 44 at the two, upper and lower, positions, whereby the frame 36 is fixed to the back surface of the visor 14.

Referring back to FIG. 3, a resin washer 48 is loosely fitted on an outer circumference of the cylinder 40 in the inner space 38 of the frame 36.

Figure 6:
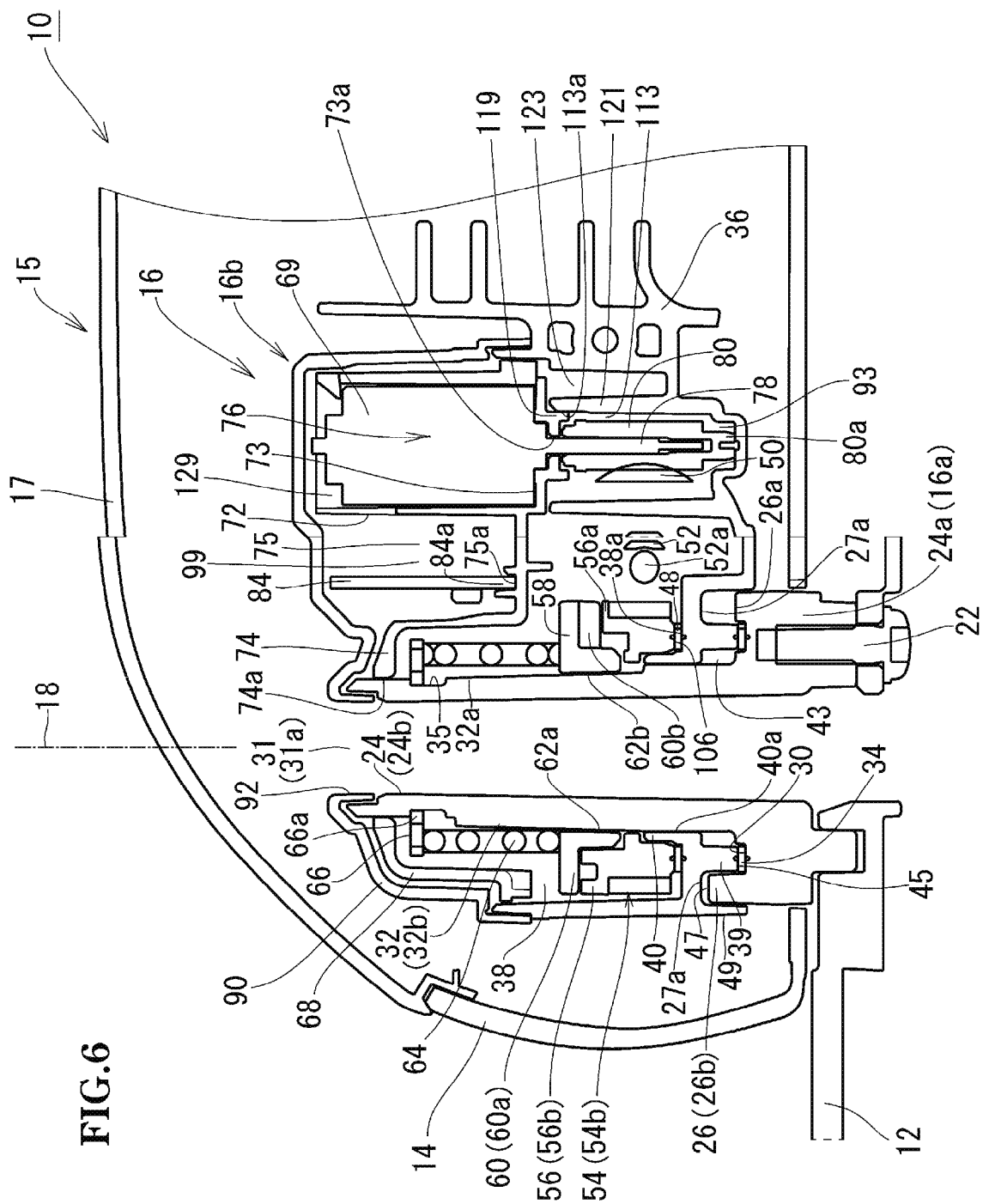
FIG. 6 is a diagram illustrating an assembled state of the door mirror 10 in FIG. 2 and is a diagram of an end face cut at the position indicated by arrows A-A in FIG. 7.

The resin washer 48 is placed and supported on the bottom surface 38a of the inner space 38. The resin washer 48 is a product that is the same as the resin washer 34. An axle 52a of a metal worm 52 is inserted to a resin worm wheel 50, whereby the worm wheel 50 and the worm 52 are assembled to each other so as to be unrotatable relative to each other. The assembled worm wheel 50 and worm 52 are put in the inner space 38 of the frame 36 and disposed at a predetermined position. At this time, lower surfaces of opposite ends 52b, 52c of the axle 52a of the worm 52 are placed and supported on bearings (reference numerals 38b, 38c in FIG. 8) in the inner space 38 (see FIG. 15). Consequently, the worm wheel 50 and the worm 52 can rotate integrally in the inner space 38. A shaft outside-fitting gear 54 is rotatably fitted on the outer circumference of the cylinder 40 in the inner space 38 of the frame 36. The shaft outside-fitting gear 54 is formed of an integrally-molded product of a reinforced resin such as PA+GF resin. A hollow 55 is formed in a center of a surface of the shaft outside-fitting gear 54 as viewed in an axis direction of the shaft outside-fitting gear 54. The cylinder 40 of the frame 36 and the shaft axle 24b are rotatably inserted to the hollow 55. A bearing surface 106 (FIG. 6) in a lower surface of the shaft outside-fitting gear 54 is slidably placed and supported on the resin washer 48 (FIG. 6). At an outer circumferential surface of the shaft outside-fitting gear 54, gear teeth 54b of a helical gear are formed. Consequently, the shaft outside-fitting gear 54 forms a worm wheel. The gear teeth 54b engage with the worm 52. Consequently, the shaft outside-fitting gear 54 and the worm 52 form a worm gear. A shaft outside-fitting gear-side clutch surface 56 is formed at an upper surface of the shaft outside-fitting gear 54. The shaft outside-fitting gear-side clutch surface 56 is formed of five sets of a clutch valley 56a and a clutch crest 56b arranged alternately in a direction around an axis of the shaft outside-fitting gear 54, the sets being each arranged with a same circumferential length. A circumferential length (angle) of one clutch valley 56a and a circumferential length (angle) of one clutch crest 56b are set to be equal to each other.

The clutch plate 58 is put onto the shaft axle 24b. Consequently, the clutch plate 58 is placed and supported on the shaft outside-fitting gear 54 concentrically with the shaft outside-fitting gear 54. The clutch plate 58 is formed of an integrally-molded product of a reinforced resin such as PA+GF resin. A hollow 59, to which the shaft axle 24b is inserted so as to be unrotatable and movable axially, is formed in a center of a surface of the clutch plate 58 as viewed in an axis direction of the clutch plate 58. At a lower surface of the clutch plate 58, a shaft-side clutch surface 60 is formed.

The shaft-side clutch surface 60 is formed of five sets of a clutch valley 60a and a clutch crest 60b arranged alternately in a direction around the axis of the clutch plate 58, the sets being each arranged with a same circumferential length. The shaft outside-fitting gear-side clutch surface 56 and the shaft-side clutch surface 60 form a clutch mechanism 61. A circumferential length (angle) of one clutch valley 60a and a circumferential length (angle) of one clutch crest 60b of the shaft-side clutch surface 60 are set to be equal to each other. Also, the shaft outside-fitting gear-side clutch surface 56 and the shaft-side clutch surface 60 are equal to each other in inner diameter and outer diameter. Therefore, the clutch valleys 56a and the clutch crests 56b of the shaft outside-fitting gear-side clutch surface 56 are fitted to the clutch crests 60*b* and the clutch valleys 60*a* of the shaft-side clutch surface 60 with no backlash. A height changing part at a position of a boundary between each clutch valley 56*a* and the relevant clutch crest 56*b* and a height changing part at a position of a boundary between each clutch valley 60*a* and the relevant clutch crest 60*b* are formed of respective inclined surfaces, inclination angles of which are equal to each other. Consequently, the fit between the shaft outside-fitting gear-side clutch surface 56 and the shaft-side clutch surface 60 can be cancelled by means of a rotational force acting between these clutch surfaces 56, 60. A rotation preventing shape 62 is formed at an inner circumferential surface of the clutch plate 58. The rotation preventing shape 62 is formed of five sets of a rotation preventing recess 62*a* and the rotation preventing projection 62*b* that are arranged circumferentially and extend axially. The rotation preventing recesses 62*a* and the rotation preventing projections 62*b* face the rotation preventing projections 32*b* and the rotation preventing recesses 32*a* formed at the outer circumferential surface of the shaft axle 24*b*, respectively, via a small gap. Consequently, the rotation preventing recesses 62*a* and the rotation preventing projections 62*b* are fitted to the rotation preventing projections 32*b* and the rotation preventing recesses 32*a* so as to be unrotatable in the direction around the axis and slidable axially. As a result, the clutch plate 58 is fitted on the shaft axle 24*b* so as to be unrotatable in a direction around the axis of the shaft axle 24*b* and movable axially.

The coil spring 64 is put on the shaft axle 24*b*. Consequently, the coil spring 64 is placed and supported on the clutch plate 58 concentrically with the clutch plate 58. The metal plate 66 is disposed on the coil spring 64. The coil spring 64 is pressed and contracted by the metal plate 66, whereby the metal plate 66 is put onto the shaft axle 24*b*. Protrusions 66*a* formed at an inner circumferential surface of the metal plate 66 are inserted to the grooves 35 formed in the outer circumferential surface of the upper part of the shaft axle 24*b* and the metal plate 66 is pressed downward, and next, the metal plate 66 is rotated, whereby the metal plate 66 is fitted to the upper part of the shaft axle 24*b*. Consequently, the coil spring 64 is fitted in a contracted state to the shaft axle 24*b*. At this time, an expansion force of the coil spring 64 acts between an upper surface of the clutch plate 58 and a lower surface of the metal plate 66. This expansion force provides a fitting force between the crest-valley repeated shape 26 at the upper surface of the shaft base 24*a* and the crest-valley repeated shape 27 (FIG. 4) at the lower surface of the frame 36 and also between the shaft outside-fitting gear-side clutch surface 56 at the upper surface of the shaft outside-fitting gear 54 and the shaft-side clutch surface 60 at the lower surface of the clutch plate 58. However, when the mirror rotating section 15 is located between the retracted position and the extended position, the expansion force provided from the coil spring 64 to the frame 36 is received by the bearing surface 30 via the resin washer 34 through the bearing surface 45, and thus, rotation of the mirror rotating section 15 is performed by the bearing surfaces 45, 30 sliding on each other with the resin washer 34 therebetween. In other words, the rotation of the mirror rotating section 15 is bearing-supported by the abutment and sliding between the bearing surfaces 45, 30 with the resin washer 34 therebetween. Therefore, at this time, the opposed surfaces of the crest-valley repeated shapes 26, 27 are separated and are neither in abutment with nor slide on each other (see FIG. 6).

Figure 13:
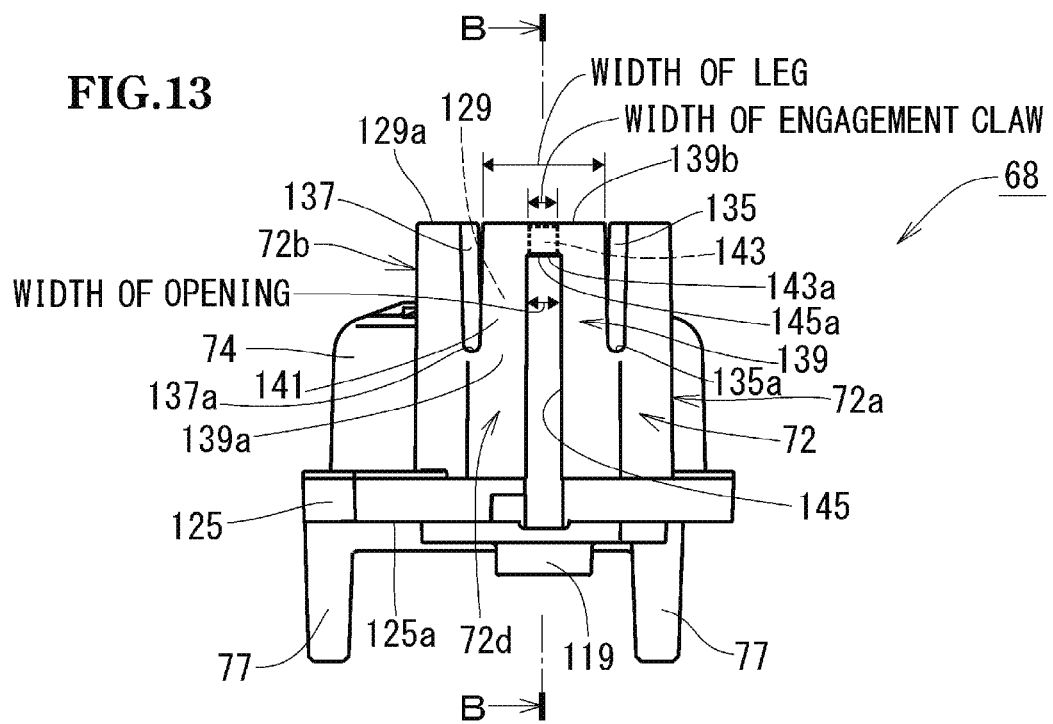
FIG. 13 is a side view of the outer plate 68 illustrated in FIG. 3 as viewed from another side.

After assembly of all of the respective components illustrated on the right side of FIG. 3, an outer plate 68 is placed on a step 36*b* on the inner circumferential side of an opening 36*a* at an upper end of the frame 36 and then the opening 36*a* is thus closed. The outer plate 68 is formed of an integrally-molded product of a resin such as POM (polyacetal). The outer plate 68 includes a barrel 72 and a dome 74 at an upper surface thereof. The barrel 72 receives and holds a motor 76. The dome 74 surrounds an upper part of the shaft axle 24*b*, the upper part protruding upward from the opening 36*a* of the frame 36, and the coil spring 64 and the metal plate 66. Consequently, the motor 76 is disposed at a position on the lateral side of the shaft axle 24*b*. At this time, a rotation axis of the motor 76 is parallel to the axis of the shaft 24 (which corresponds to the rotation axis 18). A circular hole 74*a* that allows the upper part of the shaft axle 24*b* to protrude therefrom is provided in a center of a surface of the dome 74 as viewed in an axis direction of the dome. Before the outer plate 68 is put on the frame 36, the motor 76 is inserted to the barrel 72 from above and the motor 76 is thus fitted to the outer plate 68. A motor shaft (output shaft or rotation axis rod) 78 of the motor 76 protrudes vertically downward below the outer plate 68 through a hole 73*a* formed in a center of a bottom 73 (FIGS. 6 and 9) in the barrel 72. A worm 80 is fitted onto the motor shaft 78. In a state in which the outer plate 68 holds the motor 76 and the worm 80 in this way, the outer plate 68 is placed on the step 36*b* on the inner circumferential side of the opening 36*a* of the frame 36. At this time, the worm 80 and the worm wheel 50 engage with each other and form a worm gear. Also, the worm 80, the worm wheel 50, the worm 52, the shaft outside-fitting gear 54 and the clutch plate 58 form a power transmission mechanism 81 that transmits a driving force of the motor 76 to the shaft axle 24*b*. Also, at a lower surface of the outer plate 68, two protruding pieces 77 (FIGS. 10, 11 and 13) are formed so as to protrude downward from the lower surface. Lower end faces of the two protruding pieces 77 face upper surfaces of the opposite ends 52*b*, 52*c* of the axle 52*a* of the worm 52 via a small gap, respectively, whereby upward movement of the worm 52 and the worm wheel 50 is restricted. After the placement of the outer plate 68 on the step 36*b* on the inner circumferential side of the opening 36*a* of the frame 36, the outer plate 68 is fixed to the frame 36 via two screws 82.

After the fixation of the outer plate 68 to the frame 36, a circuit board (printed board) 84 is disposed upright in a space 75, between the barrel 72 and the dome 74, of the upper surface of the outer plate 68 (in other words, a space between the motor 76 and the shaft axle 24*b*). Since the shaft outside-fitting gear 54 is formed of a material including a resin as a base material, the shaft outside-fitting gear 54 has a large diameter compared to a metal shaft outside-fitting gear in order to ensure a strength necessary as a shaft outside-fitting gear. Accordingly, the space 75 between the motor 76 and the shaft axle 24*b* is expanded. Therefore, even if an entire thickness of the circuit board 84 with a connector receiving tool (socket) 88, etc., mounted thereon is large because of the mounting of such components on the circuit board 84, the circuit board 84 can easily be disposed in the space 75. On the circuit board 84, a motor drive circuit, motor connection terminals 86 (male terminals), the connector receiving tool 88 (socket or connector receiving portion) are mounted. The motor drive circuit supplies electric drive power to the motor 76. The motor connection terminals 86 interconnect the motor drive circuit and terminals 85 (motor terminals or female terminals, FIG. 7) of the motor 76. A connector 89 (FIG. 7) at a distal end of the wire harness (not illustrated) is inserted to the connector receiving tool 88, and as a result, the connector receiving tool 88 interconnects the wire harness and the motor drive circuit. Inside the connector receiving tool 88, a connector connection terminal 91 (FIG. 7) electrically connected to a terminal (not illustrated) of the connector 89 at the distal end of the wire harness is disposed. A lower end 84a of the circuit board 84 is inserted and supported in a groove 75a of the outer plate 68, the groove 75a being formed in a bottom of the space 75 between the barrel 72 and the dome 74. Distal ends of the motor connection terminals 86 are inserted and supported in the respective motor terminals 85. Consequently, the circuit board 84 is disposed upright in the space 75 and the motor connection terminals 86 and the motor terminals 85 are electrically connected.

After the fixation of the outer plate 68 to the frame 36 and the attachment of the circuit board 84 to the outer plate 68, a seal cap 90 is put on the outer plate 68. The seal cap 90 is formed of an integrally-molded product of a resin such as PP (polypropylene). In an upper surface of the seal cap 90, a circular hole 92 that communicates with an upper opening 31a of the hollow 31 of the shaft axle 24b is provided. Also, in one side surface of the seal cap 90, a connector insertion port 94 that communicates with a connector inlet 88a (e.g., FIG. 5) of the connector receiving tool 88 of the circuit board 84 is provided. Also, at each of four positions around an opening 96 of a lower end of the seal cap 90, a claw locking frame 98 is formed. Upon the seal cap 90 being put on the outer plate 68 and the seal cap 90 being pushed down, claws 100 configured at four positions around an upper outer circumferential surface of the frame 36 so as to protrude therefrom engage with the respective claw locking frames 98 of the seal cap 90. Consequently, the frame 36 and the seal cap 90 are joined, whereby the electric retracting unit 16 is assembled in an integrated manner. The wire harness is inserted through the hollow 31 of the shaft axle 24b of the electric retracting unit 16 assembled in this way. The wire harness includes a wiring for the electric retracting unit 16. In addition, the wire harness includes, e.g., a wiring for the mirror adjustment actuator and a wiring for a turn lamp depending on the functions included in the door mirror 10. An end on the mirror rotating section 15 side of the wire harness is drawn out from the circular hole 92 of the seal cap 90. An end on the vehicle body side of the wire harness is drawn out from a lower end of the hollow 31 of the shaft 24 and guided to the inside of the vehicle body. A connector is fitted to an end on the mirror rotating section 15 side of each wiring in the wire harness. From among the connectors, the connector 89 (FIG. 7) for a distal end of the wiring for the electric retracting unit 16 is inserted to the connector insertion port 94 and thereby connected to the connector receiving tool 88 of the circuit board 84.

Figure 5:
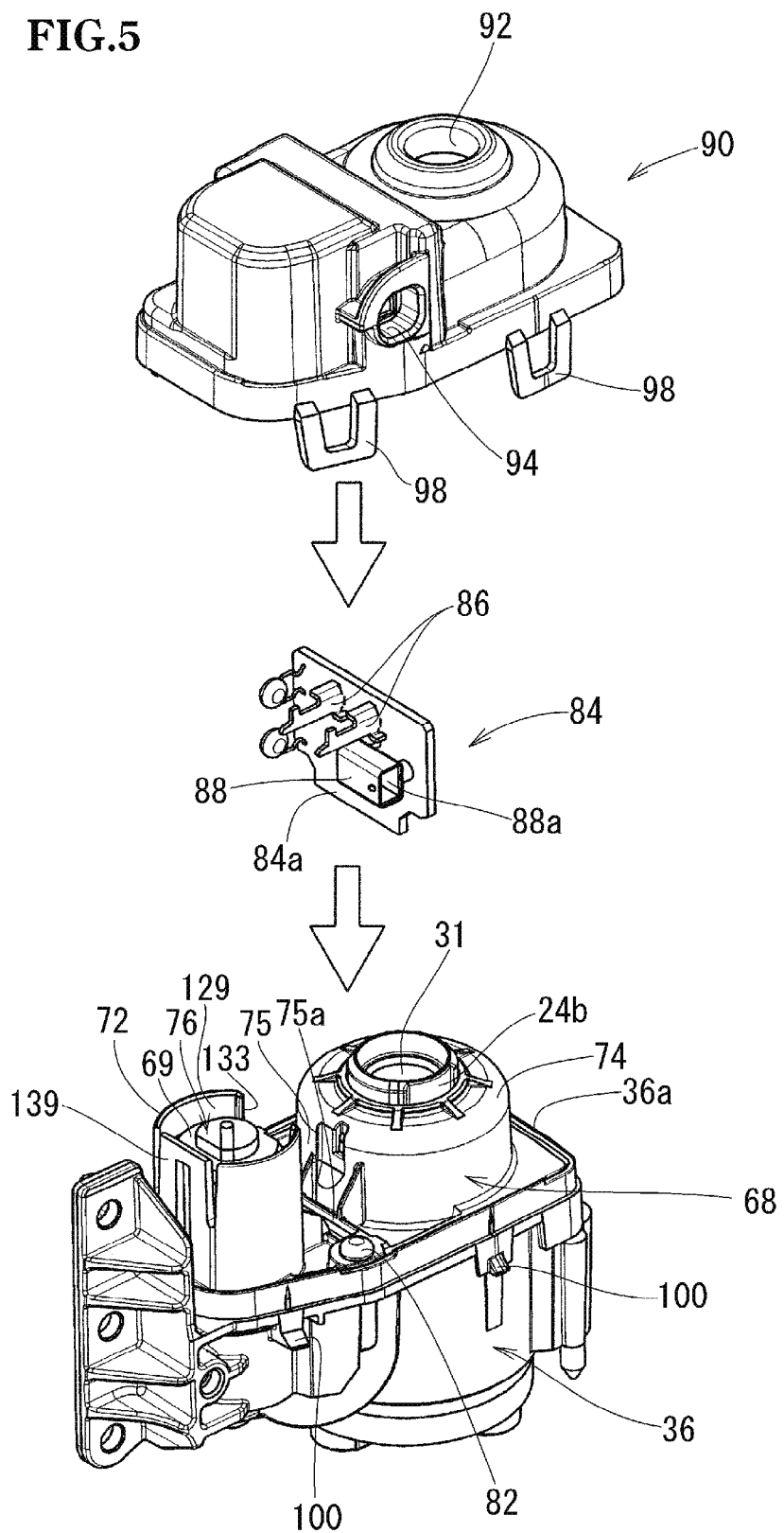
FIG. 5 is a perspective view illustrating a state in process of assembly of the respective components of the electric retracting unit 16 illustrated in FIG. 3.
Figure 7:
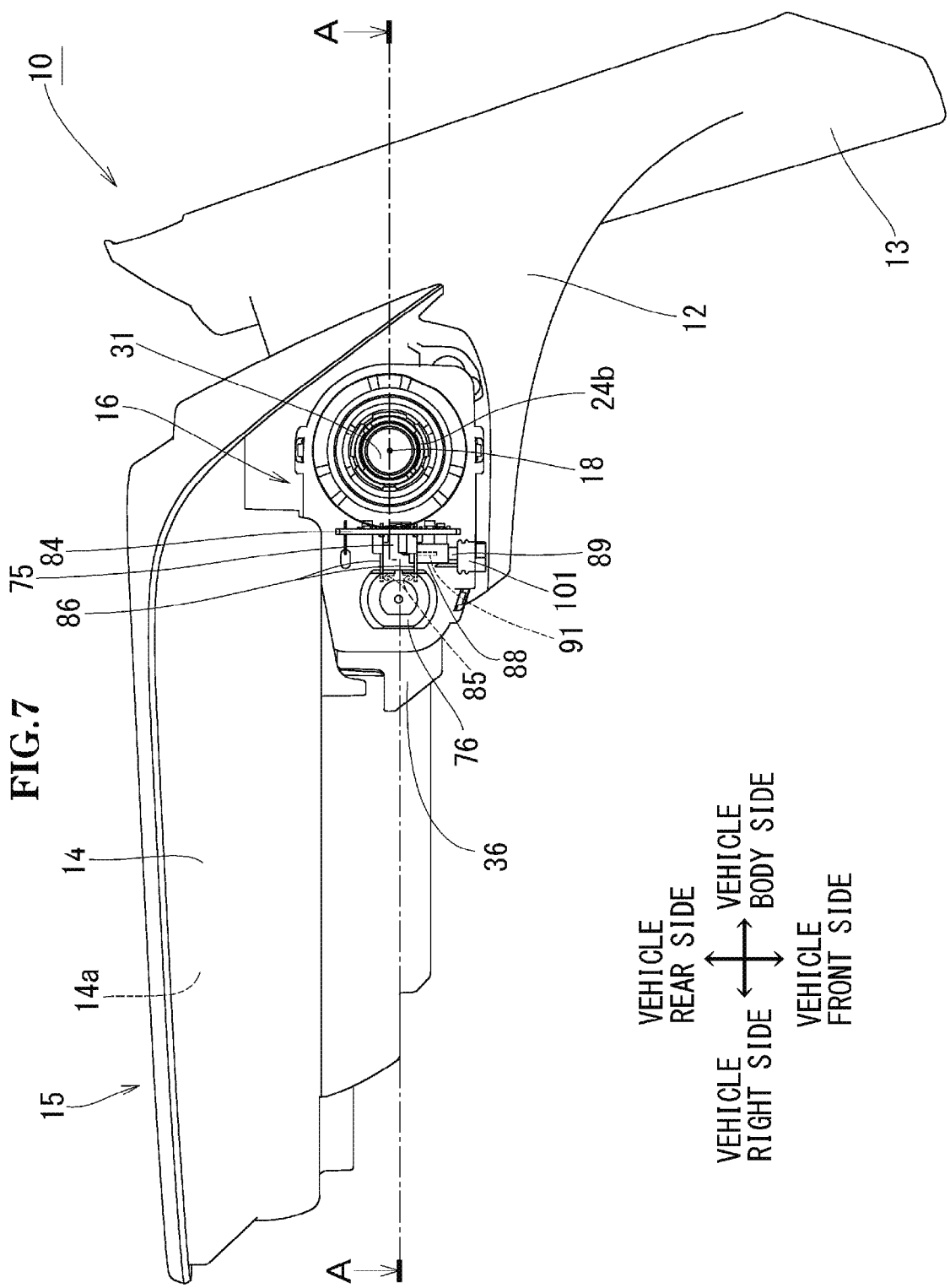
FIG. 7 is a plan view illustrating an assembled state of the door mirror 10 in FIG. 2 (with a housing cover removed) and illustrates a mirror rotating section 15 in an extended position.

FIG. 5 illustrates a manner in which the circuit board 84 and the seal cap 90 are assembled to a product in process of assembly of the electric retracting unit 16, which is illustrated in the lower part of FIG. 5. The product in process of assembly refers to a product in a state in which the respective components illustrated on the right side of FIG. 3 are assembled and the outer plate 68 holding the motor 76 and the worm 80 are fitted on the inner circumferential side of the opening 36a at the upper end of the frame 36 and fixed to the frame 36 via the two screws 82. In FIG. 5, a state in which a motor body 69 is held in the barrel 72 of the outer plate 68 is shown well. In other words, the motor 76 is held by the outer plate 68 with the motor shaft 78 (FIG. 3) facing downward. Here, the motor body 69 is held by the outer plate 68 in such a manner that the entire motor body 69 is buried in the inner space 129 of the barrel 72 of the outer plate 68. Consequently, the motor 76 is locked so as to prevent movement in a direction orthogonal to a motor axis and rotation around the motor axis relative to the barrel 72. Also, the motor 76 is locked by the claw engagement piece 139 so as to prevent movement in the motor axis direction relative to the barrel 72. Details of this motor holding configuration will be described later. The circuit board 84 is inserted to the space 75, between the barrel 72 and the dome 74, of the upper surface of the outer plate 68. The lower end 84a of the circuit board 84 is detachably inserted to the groove 75a of the outer plate 68. The distal ends of the motor connection terminals 86 are detachably inserted to the respective motor terminals 85 (FIG. 7). In this way, the circuit board 84 is detachably supported by the groove 75a and the motor terminals 85. Consequently, the circuit board 84 is assembled to the product in such a manner that the circuit board 84 stands upright in the space 75. After the assembly of the circuit board 84 to the product, the seal cap 90 is put on the product. Consequently, the claws 100 of the frame 36 detachably engage with the claw locking frame 98 of the seal cap 90, whereby the seal cap 90 is assembled to the product. After the assembly of the seal cap 90 to the product, the wire harness is inserted through the hollow 31 of the shaft axle 24b. In a state in which the seal cap 90 is assembled to the product, the connector inlet 88a of the connector receiving tool 88 of the circuit board 84 and the connector insertion port 94 of the seal cap 90 communicate with each other. Consequently, a state in which the connector 89 for the wiring for the electric retracting unit 16 in the wire harness can be inserted to the connector inlet 88a from the connector insertion port 94 and joined to the connector receiving tool 88 is achieved.

FIG. 6 illustrates the door mirror 10 having the above-described configuration, the door mirror 10 being cut at a position extending through respective center axes of the shaft 24 and the motor 76. This corresponds to a structure of an end face cut at the position indicated by arrows A-A in FIG. 7. FIG. 6 illustrates a state when the housing cover 17 is fitted to the visor 14, the mirror rotating section 15 is in the extended position and the shaft outside-fitting gear-side clutch surface 56 and the shaft-side clutch surface 60 engage with each other. At this time, although not shown in FIG. 6, the inclined surfaces of the boundaries between the crests 26b and the valleys 26a and the relevant inclined surfaces of the boundaries between the crests 27b and the valleys 27a are in abutment with each other and whereby the crest-valley repeated shape 26 and the crest-valley repeated shape 27 are locked by each other. In the state in which the mirror rotating section 15 is in the extended position in FIG. 6, upon an instruction for retracting being provided by operating a mirror switch, the motor 76 is started. Rotation of the motor 76 is transmitted to the shaft outside-fitting gear 54 via the worm 80, the worm wheel 50 and the worm 52. At this time, the shaft outside-fitting gear-side clutch surface 56 and the shaft-side clutch surface 60 engage with each other, and the shaft outside-fitting gear 54 is thereby unrotatable relative to the shaft axle 24b, and thus, instead, a force acts so as to rotate the frame 36 in the direction around the axis of the shaft axle 24b. Consequently, the bearing surface 30 and the bearing surface 45 slide on each other with the resin washer 34 therebetween, and the bottom surface 38a of the inner space 38 of the frame 36 and the bearing surface 106 of the lower surface of the shaft outside-fitting gear 54 slide on each other with the resin washer 48 therebetween, whereby the mirror rotating section 15 rotates in a retracting direction. Upon the rotation of the mirror rotating section 15 being physically stopped in the retracted position by engagement between the stopper 51 (FIG. 4) and the one end of stopper groove 57 (FIG. 2), the stoppage is detected and the driving of the motor 76 is stopped. Consequently, the mirror rotating section 15 is held in the retracted position.

In this state, upon an instruction for extending being provided by operating the mirror switch, the motor 76 is started in a reverse direction, whereby the mirror rotating section 15 rotates in an extending direction. Upon the rotation of the mirror rotating section 15 being stopped in the extended position by engagement between the inclined surfaces of the boundaries between the crests 26b and the valleys 26a of the crest-valley repeated shape 26 and the inclined surfaces of the boundaries between the crests 27b and the valleys 27a of the crest-valley repeated shape 27, the stoppage is detected and the driving of the motor 76 is stopped. Consequently, the mirror rotating section 15 is held in the extended position.

FIG. 7 illustrates a state in which the door mirror 10 in FIG. 2 is assembled and mounted in a vehicle. The mirror rotating section 15 is illustrated in a state in which the mirror rotating section 15 is in the extended position and is viewed from above. Also, FIG. 7 illustrates the door mirror 10 with the housing cover 17 (FIG. 6) removed and the inside of the electric retracting unit 16 seen through. Also, FIG. 7 illustrates the door mirror 10 in a state in which the connector 89 for the wiring for the electric retracting unit 16 in the wire harness is inserted to the connector receiving tool 88, with rubber packing 101 attached to the connector 89. In FIG. 7, the motor connection terminals 86 of the circuit board 84 are inserted to the motor terminals 85. The lower end 84a of the circuit board 84 is inserted to the groove 75a (FIGS. 3, 5 and 6) formed in the outer plate 68. The entire circuit board 84 is disposed upright in the space 75 between the motor 76 and the shaft axle 24b in a state in which the circuit board 84 is supported in this way.

Figure 8:
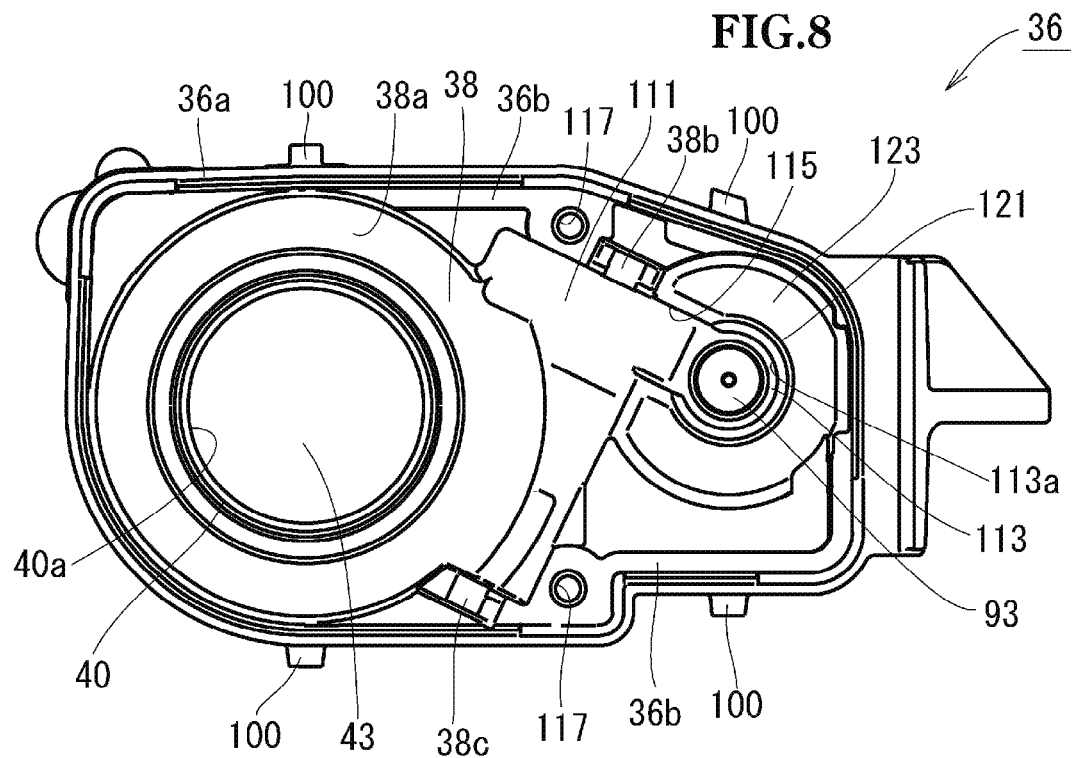
FIG. 8 is a plan view of the frame 36 illustrated in FIG. 3.

A configuration of the inside of the inner space 38 of the frame 36 will be described with reference to FIG. 8. Inside the inner space 38 of the frame 36, in addition to the components already described, e.g., a worm wheel receiving space 111, a worm receiving space 113, a worm wheel entry port 115 and two screw holes 117 are formed. The worm wheel receiving space 111 receives the worm wheel 50 coaxially fixed and fitted to the axle 52a of the worm 52. At this time, the opposite ends 52b, 52c of the axle 52a of the worm 52 are supported on the bearings 38b, 38c. The worm receiving space 113 is a space that coaxially receives the worm 80, and is formed of a space having a circular column shape having a diameter that is larger than that of the worm 80. The worm wheel entry port 115 causes the worm wheel receiving space 111 and the worm receiving space 113 to communicate with each other. Consequently, the worm wheel entry port 115 causes an outer circumferential surface of the worm wheel 50 to enter the worm receiving space 113 through the worm wheel entry port 115.

As a result, the worm wheel 50 and the worm 80 engage with each other. The two screw holes 117 are screw holes for screw-in of the two screws 82 (FIG. 3) for fixing the outer plate 68 to the frame 36. A bearing recess 93 having a diameter that is smaller than a general diameter of the worm receiving space 113 is formed in a bottom of the worm receiving space 113.

Grease is charged in the bearing recess 93, and a distal end 80a (FIG. 16) of the worm 80 is received in the bearing recess 93. Consequently, the distal end 80a of the worm 80 is bearing-supported in the bearing recess 93.

At the lower surface of the outer plate 68, a circular projection 119 (FIGS. 10 and 11) is formed concentrically with the hole 73a (hole for letting the motor shaft 78 through, FIGS. 16 and 6) in the lower surface of the outer plate 68. The projection 119 is received in a circular upper opening 113a of the worm receiving space 113. At this time, the projection 119 is received in the upper opening 113a with no gap (or with almost no gap) therearound except a part facing the worm wheel entry port 115. Consequently, an area that is no less than a half of an entire outer circumferential surface of the projection 119 is surrounded and supported by an inner circumferential surface of the upper opening 113a. As a result, the motor shaft 78 protruding from the hole 73a at a center of the projection 119 is positioned relative to the worm receiving space 113 in a surface direction perpendicular to an axis of the motor shaft 78. Around the worm receiving space 113, a cylindrical wall 121 having a constant thickness is provided, and a deep lightening hole 123 is provided outside the cylindrical wall 121. The lightening hole 123 is formed at a place excluding the part facing the worm wheel entry port 115, and consequently, the lightening hole 123 is formed in a C shape in plan view. The provision of the lightening hole 123 enables suppression of sink marks accompanying resin molding of the frame 36 and thus enables enhancement in molding accuracy of the upper opening 113a of the worm receiving space 113. Consequently, an accuracy of positioning of the motor shaft 78 relative to the worm receiving space 113 in the surface direction perpendicular to the axis of the motor shaft 78 is improved. As a result, the engagement between the worm 80 and the worm wheel 50 is maintained in a normal state, enabling operating sound generated when the worm 80 and the worm wheel 50 rotate in engagement can be maintained at a normal level.

A configuration of the outer plate 68 providing a motor holding member will be described with reference to FIGS. 9 to 13. The outer plate 68 includes a plate-like portion 125 having a flat plate shape. At the upper surface of the plate-like portion 125, the barrel 72 and the dome 74 are provided perpendicular to the plate-like portion 125 so as to protrude side by side with the space 75 therebetween. The plate-like portion 125 is placed and supported on the frame 36. At this time, a lower surface circumferential edge 125a (e.g., FIG. 10) of the plate-like portion 125 abuts on the step 36b (FIG. 8) on the inner circumferential side of the opening 36a of the upper end of the frame 36. At a lower surface of the plate-like portion 125, the two protruding pieces 77 are provided so as to protrude downward. The lower end surfaces of the respective protruding pieces 77 face the respective upper surfaces of the opposite ends 52b, 52c of the axle 52a of the worm 52 (FIG. 15) via a small gap between the lower end surfaces and the upper surfaces, respectively. Consequently, these protruding pieces 77 restrict upward movement of the worm 52 and the worm wheel 50. In a periphery of a surface of the plate-like portion 125, two screw through holes 127 are provided. These two screw through holes 127 communicate with the two screw holes 117 (FIG. 8) of the frame 36. The outer plate 68 is placed and supported on the step 36b on the inner circumferential side of the opening 36a at the upper end of the frame 36, and the two screws 82 (FIG. 3) are screwed into the screw holes 117 through the screw through holes 127, whereby the outer plate 68 is fixed to the frame 36.

Figure 14:
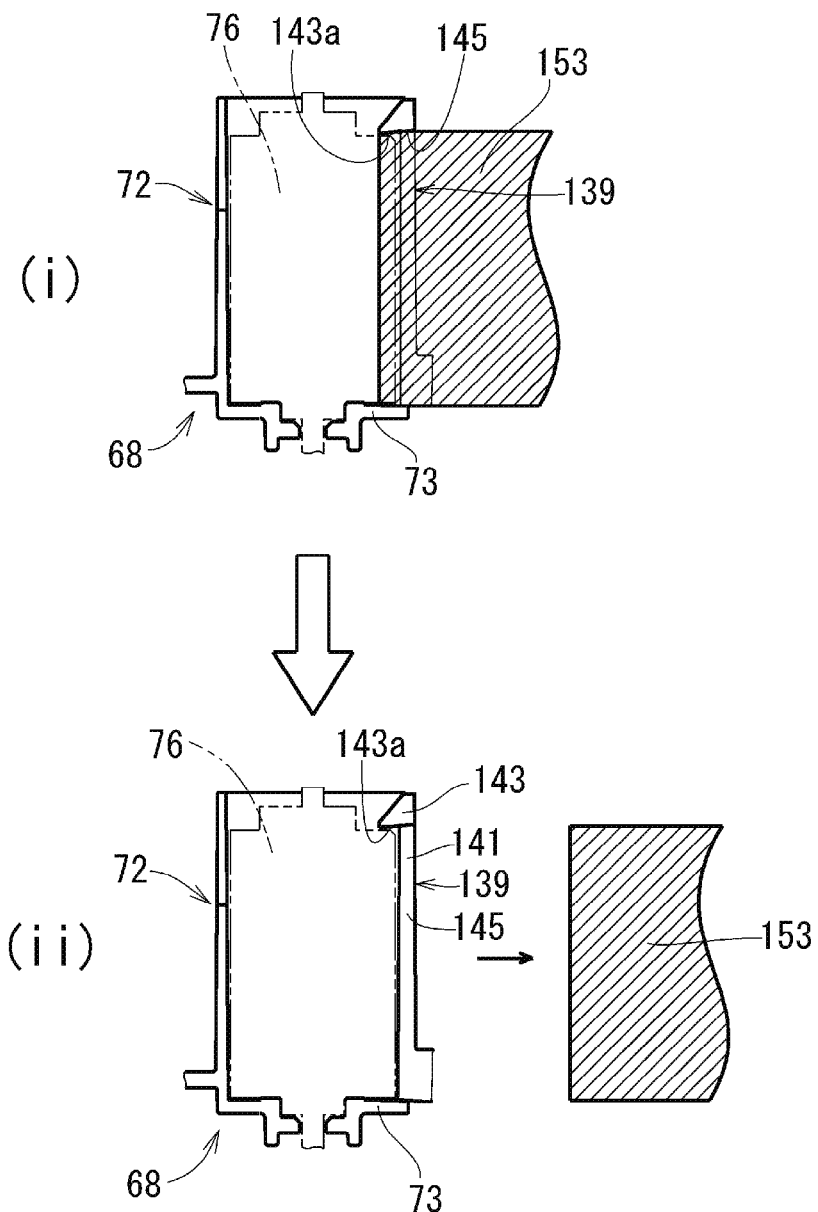
FIG. 14 is a diagram illustrating a process of forming an undercut (engagement surface 143*a*) of an engagement claw 143 of a claw engagement piece 139 using a slide core 153 when the outer plate 68 illustrated in FIG. 3 is resin-molded and is a diagram of an end face cut at the position indicated by arrows B-B in FIG. 13.

A configuration of the barrel 72 will be described. In FIGS. 9 to 13, the barrel 72 includes an inner space 129. The inner space 129 receives and holds the motor body 69 (e.g., FIG. 16). A depth of the inner space 129 (height from a surface of the bottom 73 of the inner space 129 to an open end 129a) is longer than an axial length of the motor body 69 (length from a front end face 69a to a rear end face 69b of the motor body 69; see FIG. 16). Consequently, the motor body 69 is entirely received in the inner space 129 of the barrel 72. The barrel 72 includes a pair of circular arc portions 72*a*, 72*b* facing each other and a pair of flat portions 72*c*, 72*d* facing each other (e.g., FIG. 9) so as to conform to a shape of the motor body 69. The inner space 129 opens upward. The motor 76 can be made to enter the inner space 129 from the open end 129*a* of the inner space 129. At a circumferential wall surface of the inner space 129, a plurality of ridges 131 (FIGS. 9 and 12) are formed so as to extend in a top-bottom direction. These ridges 131 are intended to abut on an outer circumferential surface of the motor 76 and thereby hold the motor 76 in the inner space 129 with no backlash. In other words, the ridges 131 are formed at a total of six sites, which are one site at a center in a width direction of each of the circular arc portions 72*a*, 72*b* and two sites at opposite ends in a width direction of each of the flat portions 72*c*, 72*d*. These ridges 131 are formed so as to extend from a position of the surface of the bottom 73 of the inner space 129 to a center height position of the inner space 129. An upper end face 131*a* (FIG. 12) of each ridge 131 is formed as an inclined surface inclined in a direction of entry of the motor body 69 (direction facing the motor body 69 that is to be made to enter the inner space 129). These inclined surfaces are intended to prevent the front end face 69*a* of the motor body 69 from being caught and locked by the upper end faces 131*a* when the motor body 69 is made to enter the inner space 129. In the flat portion 72*c* of the barrel 72, a cutout 133 that opens upward is formed (e.g., FIG. 12). The motor connection terminals 86 of the circuit board 84 are connected to the motor terminals 85 through the cutout 133 (FIGS. 5 and 7). In a boundary part between the flat portion 72*d* and the circular arc portion 72*a* and a boundary part between the flat portion 72*d* and the circular arc portion 72*b* in the barrel 72, cutouts 135, 137 are provided along border lines of the respective boundary parts so as to extend in the top-bottom direction (axis direction of the inner space 129 of the barrel 72) (e.g., FIGS. 12 and 13). Upper ends of the cutouts 135, 137 open toward an upper end of the barrel 72 (open end 129*a* of the inner space 129). Lower ends of the cutouts 135, 137 are positioned substantially midway in the top-bottom direction of the barrel 72. A substantially upper half part of the barrel 72 includes a part circumferentially separated by the cutouts 135, 137. The separated part forms the claw engagement piece 139. In other words, the claw engagement piece 139 is formed by a part that is in a circumferential direction of the substantially upper half part of the barrel 72. A lower end of the claw engagement piece 139 is connected to a substantially lower half part of the barrel 72, as a fixed end 139*a*. An upper end of the claw engagement piece 139 forms a free end 139*b*. Consequently, the claw engagement piece 139 can elastically be deformed and bent in an inside-outside direction of the barrel 72 by an external force, with the fixed end 139*a* as a support. A distal end of the free end 139*b* is located at a position that is the same in height as that of the open end 129*a* of the inner space 129 of the barrel 72. The claw engagement piece 139 includes a leg 141 and an engagement claw 143. The leg 141 is supported by the fixed end 139*a*. The engagement claw 143 is provided at a position just below the free end 139*b* in an upper part of the leg 141 on an inner circumferential surface in a center in a width direction of the leg 141, so as to face the inner space 129. The width of the leg 141 is significantly larger than a width of the engagement claw 143. Even if a width of a later-described opening 145 is subtracted from the width of the leg 141, the width of the leg 141 after the subtraction is still larger than the width of the engagement claw 143. Therefore, the leg 141 is formed so as to have high stiffness. A lower surface (undercut surface) of the engagement claw 143 forms an engagement surface 143*a*. The engagement surface 143*a* is a surface substantially orthogonal to the direction of entry of the motor 76. The engagement surface 143*a* is disposed at a position below the open end 129*a* of the inner space 129 (that is, a position on a deeper side of the inner space 129 relative to the open end 129*a*). The engagement surface 143*a* abuts on the rear end face 69*b* of the motor body 69 and locks the motor body 69 so as to prevent movement in a direction in which the motor body 69 exits from the inner space 129. An upper surface of the engagement claw 143 includes an inclined surface 143*b*. At a center in the width direction of the leg 141, the opening 145 is provided. The opening 145 linearly extends downward from a position just below the engagement surface 143*a*. A width of the opening 145 is formed so as to be equal to a width of the engagement surface 143*a* or be larger than the width of the engagement surface 143*a*. Since the width of the leg 141 is larger than the width of the engagement claw 143, a design in which the opening 145 is formed in the leg 141 is possible. An upper end face 145*a* (FIG. 13) of the opening 145 is formed at a position that is the same in height as that of the engagement surface 143*a*. The opening 145 is provided for, during resin-molding of the outer plate 68, inserting a slide core to a position at which the opening 145 is to be formed, to form the engagement surface 143*a*, which is an undercut surface. FIG. 14 illustrates steps of forming the engagement surface 143*a* using the slide core. A slide core 153 is inserted to a position at which the engagement surface 143*a* is to be formed, in a mold for resin-molding the outer plate 68 (step (i)). In this state, a heated and molten resin is injected to the mold. After solidification of the resin, the slide core 153 is removed in a direction orthogonal to the axis of the inner space 129 of the barrel 72 (axis of the motor 76) (step (ii)). Consequently, the engagement surface 143*a* is formed and the opening 145 is provided. In order to form the engagement surface 143*a*, which is an undercut surface, it is possible to employ a method in which a slide core is inserted from the bottom 73 side of the barrel 72 instead of the method in FIG. 14. In this alternative method, a direction of removal of the slide core is set to be the axis direction of the inner space 129 of the barrel 72 (downward direction in FIG. 14). However, according to this alternative method, an opening is provided in the bottom 73 of the barrel 72 as a result of the insertion of the slide core. The opening of the bottom 73 causes the inner space 129 of the barrel 72 to communicate with a space below the bottom 73, resulting in, e.g., water and/or grease easily running in/out between the inner space 129 and the space below the bottom 73 through the opening. As a result, a failure may occur in the motor 76 and the gears and the like in the space below the bottom 73. On the other hand, the method direction of removal of the slide core 153 is set to be the direction orthogonal to the axis of the inner space 129 of the barrel 72 as in FIG. 14, the opening 145 formed as a result of the insertion of the slide core 153 is provided in the leg 141 of the claw engagement piece 139. Therefore, in this case, the bottom 73 of the barrel 72 is closed without provision of an opening resulting from insertion of a slide core, and thus, no such problem occurs. The method in FIG. 14 can be employed because the width of the leg 141 is larger than the width of the engagement claw 143.

Figure 9:
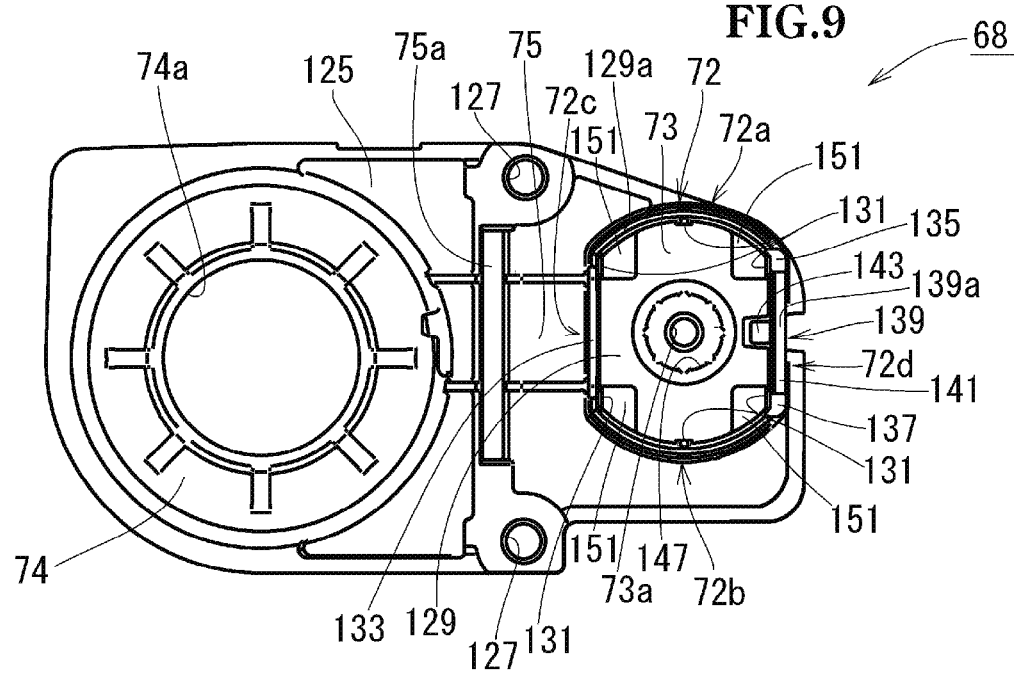
FIG. 9 is a plan view of the outer plate 68 illustrated in FIG. 3.
Figure 10:
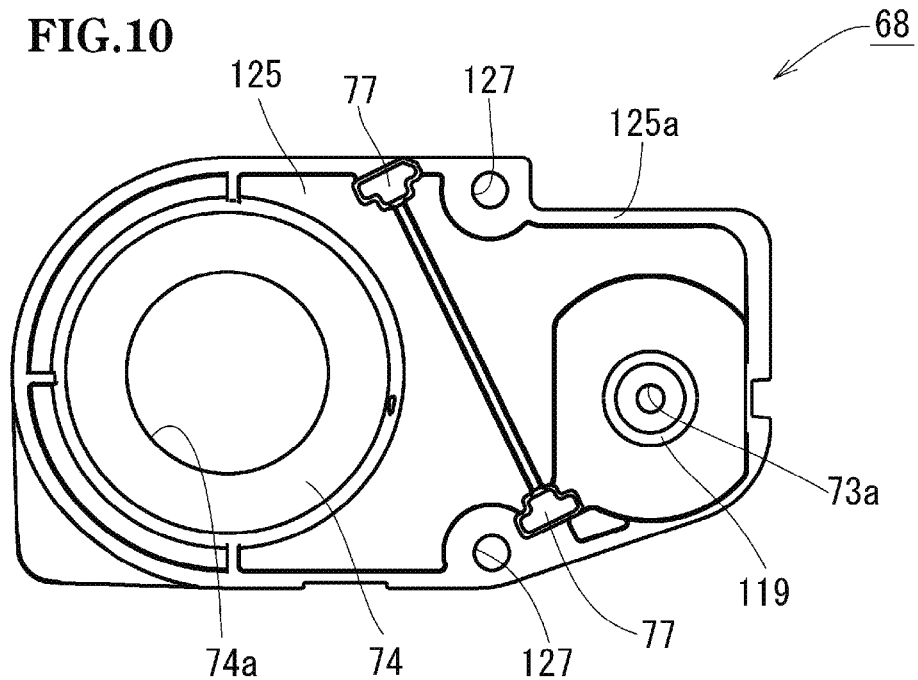
FIG. 10 is a bottom view of the outer plate 68 illustrated in FIG. 3.
Figure 11:
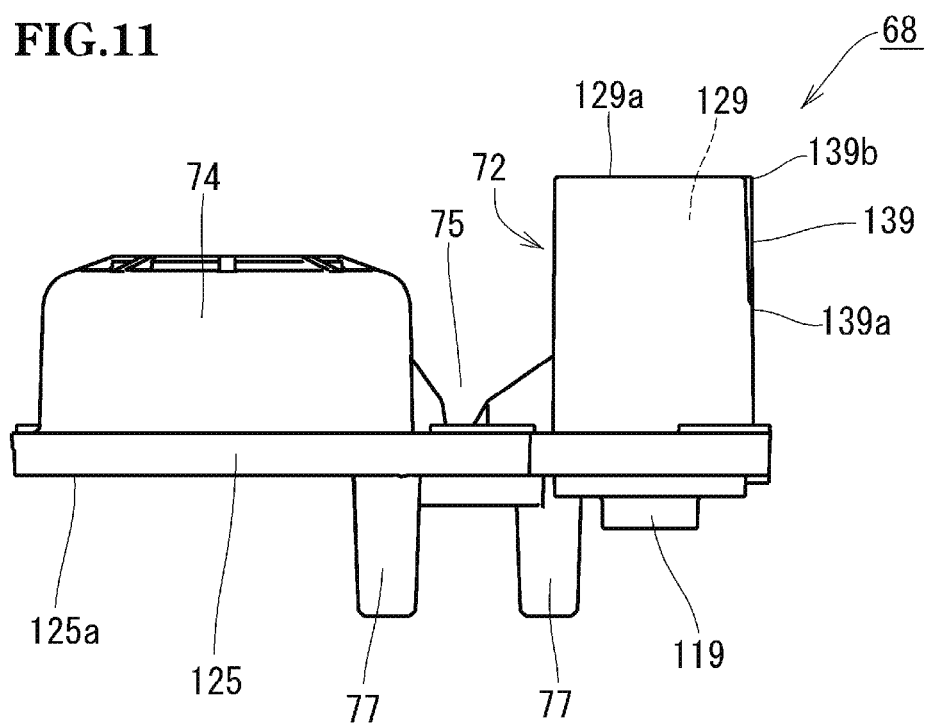
FIG. 11 is a front view of the outer plate 68 illustrated in FIG. 3.
Figure 12:
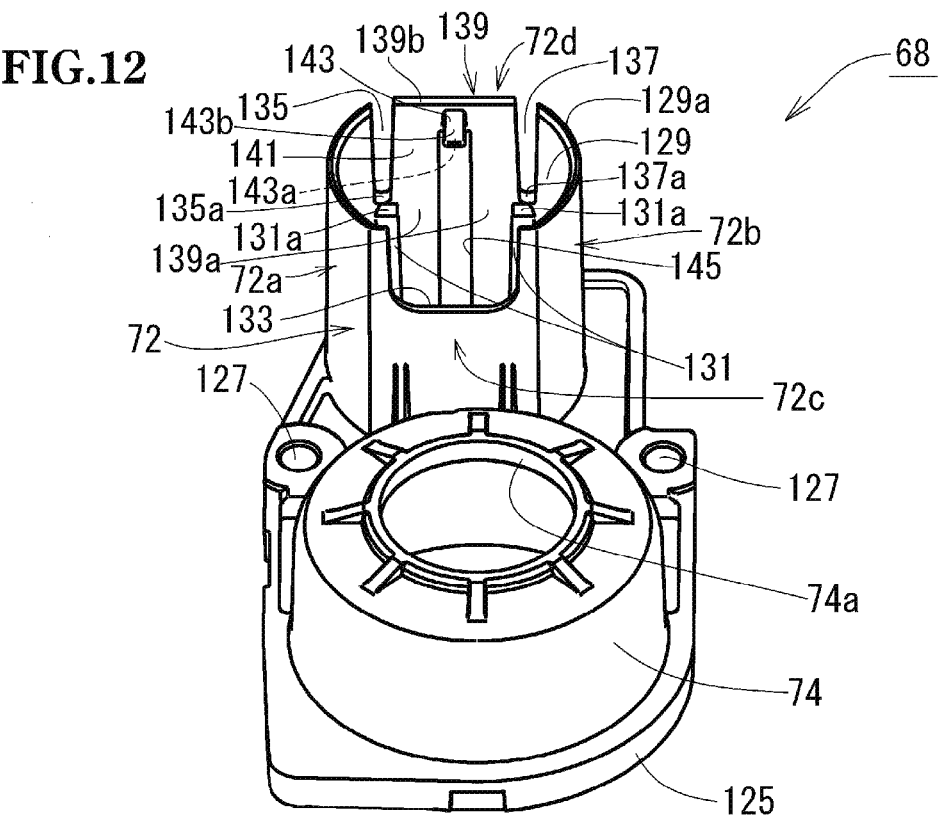
FIG. 12 is a perspective side view of the outer plate 68 illustrated in FIG. 3 as viewed from one side.

In FIGS. 9 to 13, in a center of the bottom 73 of the inner space 129 of the barrel 72, a hole 73*a* and a flat and circular recess 147 are formed (FIG. 9). The hole 73*a* is intended to let the motor shaft 78 out from the inner space 129. The recess 147 is disposed on the outer circumferential side of the hole 73a, concentrically with the hole 73a. At a center of the front end face 69a (FIG. 16) of the motor body 69, a projection 149 having a circular shape in front view is formed coaxially with the motor shaft 78. The projection 149 is fitted in the recess 147. The fitting causes the axis of the motor shaft 78 extending through the hole 73a to be highly accurately positioned at a center of the hole 73a. At each of four corners of the bottom 73 of the inner space 129 of the barrel 72, a support platform 151 having a small height is formed so as to protrude (FIG. 9). The support platforms 151 abut on respective four corners of the front end face 69a of the motor body 69 and thereby support the front end face 69a. A height from surfaces of the support platforms 151 to the engagement surface 143a is set to be just equal to a length in the axis direction of the motor body 69 (length from the front end face 69a to the rear end face 69b of the motor body 69).

Figure 15:
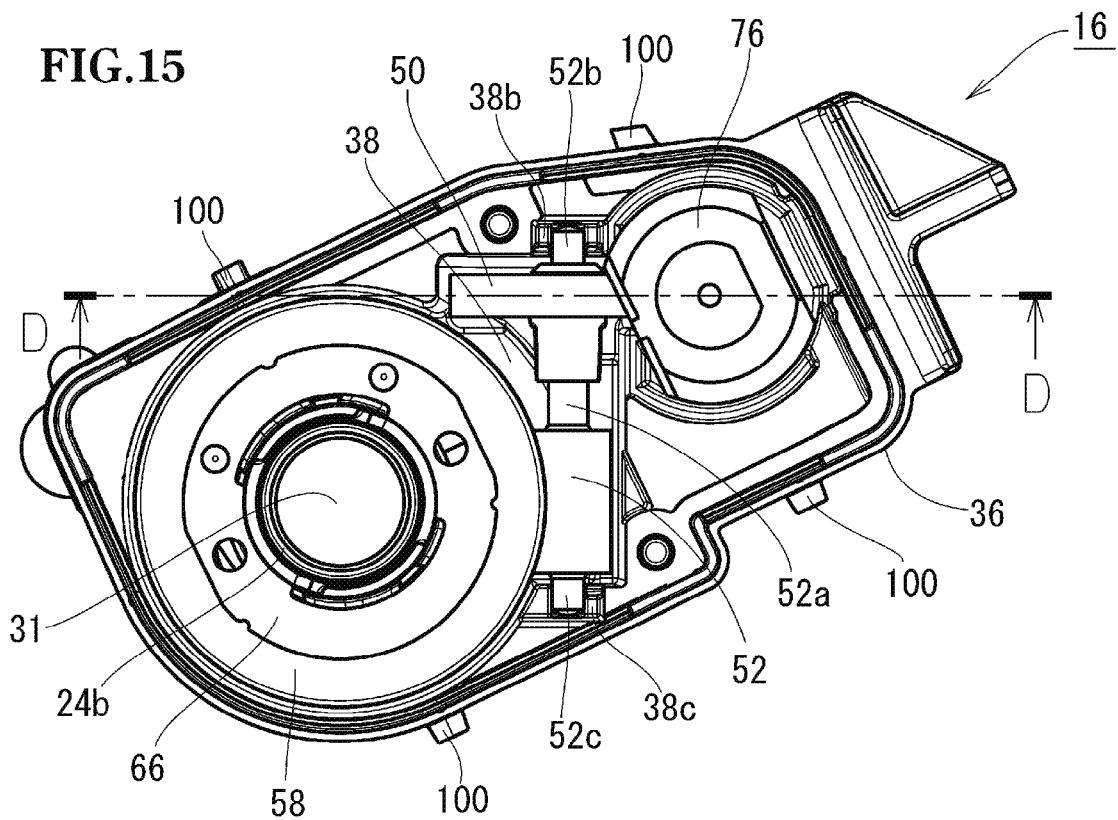
FIG. 15 is a plan view illustrating a state in which the components of the electric retracting unit 16 illustrated in FIG. 3 are assembled, with the outer plate (motor holding member) 68 and a seal cap (cover) 90 removed (motor 76 is illustrated).
Figure 16:
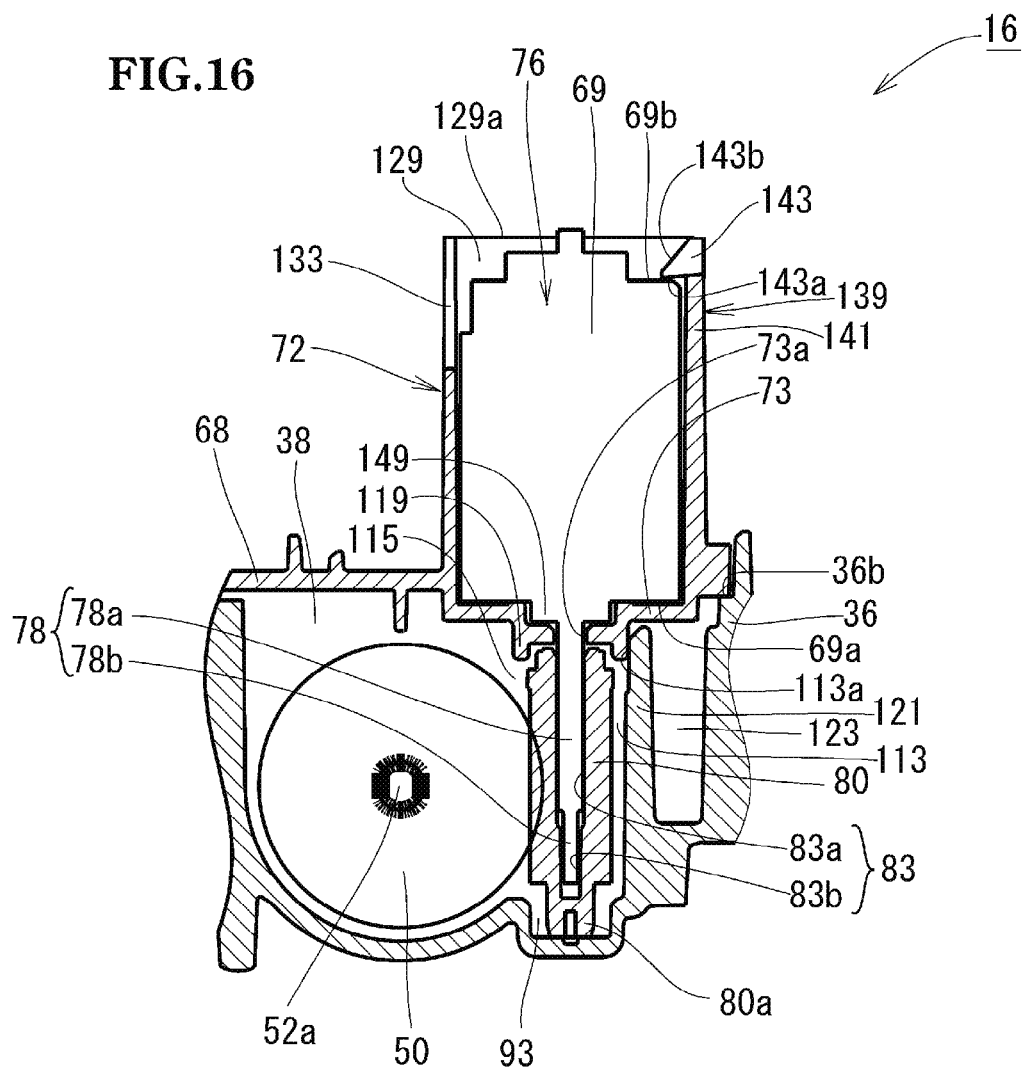
FIG. 16 is a diagram of an end face of the electric retracting unit 16 illustrated in FIG. 2 cut at the position indicated by arrow D-D in FIG. 15, with the seal cap 90 (FIG. 3) removed.

FIG. 15 is a plan view of the electric retracting unit 16 with the outer plate 68 and the seal cap 90 removed. FIG. 16 is a diagram of an end face of the electric retracting unit 16 cut at the position indicated by arrows D-D in FIG. 15. The arrangement in FIG. 16 will be described. The outer plate 68 is in abutment with and supported on the step 36b of the frame 36 and is fixed to the frame 36 via the screws 82 (FIG. 3). The motor body 69 is received and held in the barrel 72 of the outer plate 68. The engagement surface 143a of the claw engagement piece 139 engages with the rear end face 69b of the motor body 69. Consequently, return of the motor 76 from the barrel 72, that is, movement of the motor 76 in a direction opposite to the direction of entry of the motor 76 to the inner space 129, is prevented. The worm 80 is loosely fitted on the motor shaft 78. In the motor shaft 78, a circular rod 78a is formed on the proximal end side and an engagement rod 78b is formed on the distal end side, along the axis direction thereof. In a center hole 83 of the worm 80, the center hole 83 allowing the motor shaft 78 to be inserted thereto, a circular hole 83a is formed on the proximal end side and an engagement hole 83b is formed on the distal end side, along an axis direction thereof. The circular hole 83a receives the circular rod 78a and the engagement hole 83b receives the engagement rod 78b. The engagement rod 78b and the engagement hole 83b each have a non-circular shape in cross section and thus engage with each other in a direction of rotation. Consequently, upon rotation of the motor shaft 78, the worm 80 rotates following the rotation of the motor shaft 78, and the worm wheel 50 rotates following the rotation of the worm 80.

Figure 1:
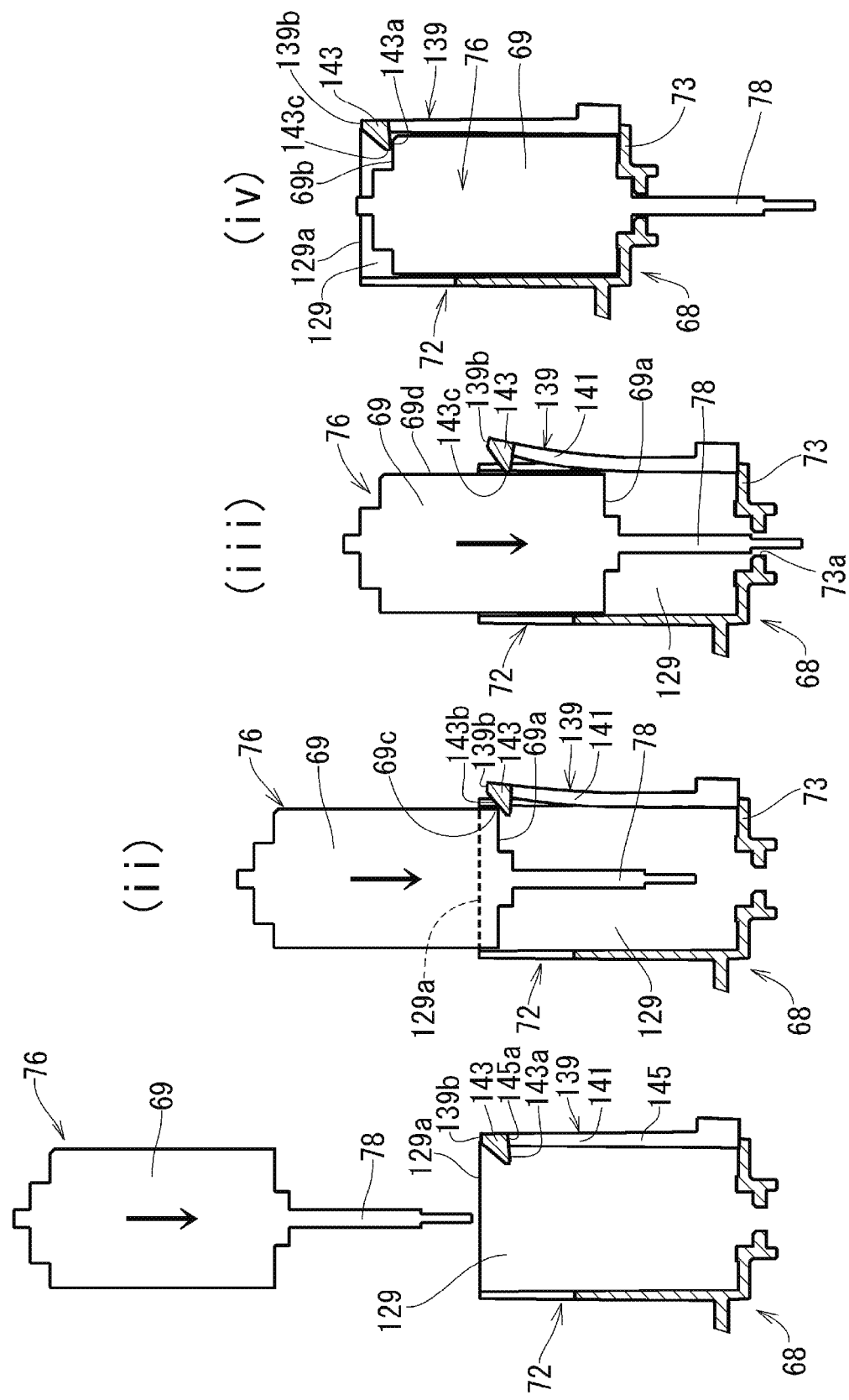
FIG. 1 is a process diagram illustrating a procedure of assembling a motor 76 to the outer plate 68 illustrated in FIG. 3 and is a diagram of an end face cut at the position indicated by arrows B-B in FIG. 13.

Steps (i) to (iv) in FIG. 1 indicate a procedure of assembling the motor 76 to the outer plate 68. The assembly is performed, for example, manually by a worker. Each of the steps in FIG. 1 will be described.

(i) A direction in a top-bottom direction of the motor 76 is set so that the motor shaft 78 side faces the inner space 129 of the barrel 72. In this position, the motor 76 is moved toward the inner space 129 in the axis direction of the motor 76.

(ii) The motor shaft 78 is made to enter the inner space 129, and subsequently the front end face 69a of the motor body 69 is made to enter the open end 129a of the barrel 72, and then, a corner 69c of an outer circumferential edge of the front end face 69a soon abuts on the inclined surface 143b in the upper surface of the engagement claw 143. As the motor body 69 is further pushed into the inner space 129, the corner 69c slides on the inclined surface 143b and bends (elastically deforms) the claw engagement piece 139 toward the outside of the barrel 72. By the time the claw engagement piece 139 starts bending, a top part of the motor body 69 is supported by the circumferential wall surface of the inner space 129, and thus, a position of the motor body 69 relative to the barrel 72 can be adjusted (the axis of the motor body 69 can be made close to an axis of the barrel 72 and inclination of the axis of the motor body 69 relative to the axis of the barrel 72 can be reduced). Therefore, the claw engagement piece 139 can be prevented from being excessively bent.

(iii) Upon the motor body 69 being still further pushed into the inner space 129, the motor body 69 advances into the inner space 129 while a distal end face 143c of the engagement claw 143 slides on a side surface 69d of the motor body 69. Upon the top part of the motor body 69 passing through lower ends 135a, 137a (FIGS. 12 and 13) of the cutouts 135, 137, the plurality of ridges 131 (FIGS. 9 and 12) disposed at proper intervals around the entire circumference of the circumferential wall surface of the inner space 129 is pressed against an outer circumferential surface of the motor body 69. Consequently, the outer circumferential surface of the motor body 69 is supported by the ridges 131 and the motor body 69 is thereby prevented from moving in the direction orthogonal to the axis of the inner space 129. Consequently, the motor body 69 is kept upright along the axis of the inner space 129. Also, the motor body 69 is prohibited from moving in a direction around the axis of the inner space 129. Furthermore, upon the motor body 69 being pushed further into the inner space 129 against a frictional force between the ridges 131 and the side surface 69d of the motor body 69, which is generated by a pushing force of the ridges 131, the motor shaft 78 starts exiting to the outside of the inner space 129 from the hole 73a of the bottom 73 of the inner space 129.

(iv) Upon the front end face 69a of the motor body 69 abutting on and being supported on the support platforms 151 (FIG. 9) at the four corners of the bottom 73 of the inner space 129, the motor body 69 is locked so as to prevent advancement. Simultaneously with this, the distal end face 143c of the engagement claw 143 reaches a rear position of the side surface 69d of the motor body 69, and thereby the distal end face 143c and the side surface 69d are released from the sliding therebetween. Consequently, the elastically deformed claw engagement piece 139 returns to the inner circumferential side, and the engagement surface 143a thereby engages with a rear end face (engaged portion) 69b of the motor body 69. Consequently, the motor 76 is locked so as to prevent movement in the motor axis direction, and the motor 76 enters a state in which the motor 76 is held in the inner space 129 of the barrel 72 with no backlash. With the above, the assembly of the motor 76 to the outer plate 68 is completed.

Figure 17:
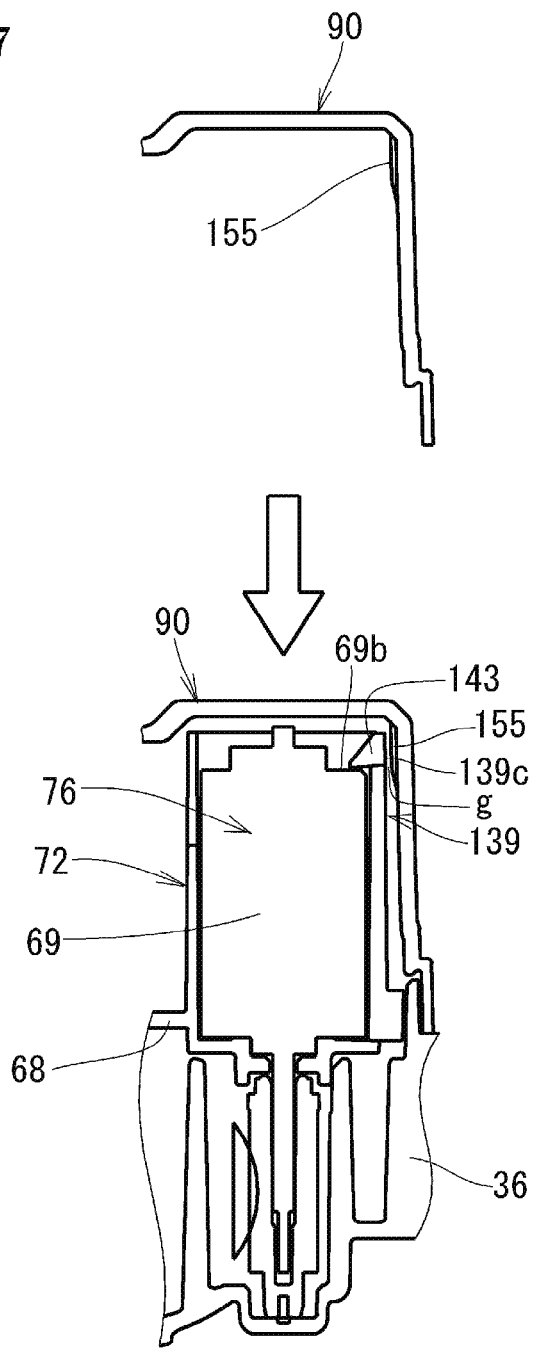
FIG. 17 is a diagram illustrating a step of putting the seal cap 90 on the outer plate 68 as a final step of assembling the respective components of the electric retracting unit 16 illustrated in FIG. 3 and is a diagram of an end face cut at the position indicated by arrows B-B in FIG. 13.

FIG. 17 illustrates a manner in which the seal cap 90 is put on the outer plate 68 in a final step of assembling the components of the electric retracting unit 16 illustrated in FIG. 3. At an inner circumferential surface of the seal cap 90, a retainer 155 is formed so as to protrude. The retainer 155 is formed at a position at which the retainer 155 faces an upper part of a back surface 139c of the claw engagement piece 139 in a state in which the seal cap 90 is put on the outer plate 68, so as to face a back surface of the engagement claw 143. Upon the seal cap 90 being putted and fitted on the outer plate 68, the retainer 155 faces the back surface of the engagement claw 143 with a small gap g therebetween. Consequently, even if the claw engagement piece 139 spreads toward the outside of the barrel 72 because of, e.g., aging, the claw engagement piece 139 abuts on and locked by the retainer 155. Consequently, disengagement between the engagement claw 143 and the rear end face 69b of the motor body 69 is prevented.

Although in the above-described embodiment, the distal end of the free end 139b of the claw engagement piece 139 is disposed at a position that is the same in height as that of the open end 129a of the inner space 129, this invention is not limited to this case. In other words, the distal end of the free end 139b of the claw engagement piece 139 can be disposed at a position that is lower or higher than that of the open end 129a of the inner space 129. In brief, the engagement surface 143a only needs to be located at a position that is lower than the open end 129a (position on a deeper side of the inner space 129 relative to the open end 129a). Also, although in the above-described embodiment, the rear end face 69b of the motor body 69 is used as an engaged part the claw engagement piece 139 engages with, an engaged portion of a motor body is not limited to this case.

In other words, e.g., a recess in a side surface of a motor body can be used as an engaged portion a claw engagement piece engages with. Also, although the above embodiment has been described in terms of the case where this invention is applied to an electric retractable rear view mirror for a vehicle, this invention is not limited to this case. In other words, this invention is applicable to any of an electric retractable rear view camera for a vehicle, the rear view camera being mounted on a door of a vehicle so as to protrude to the lateral side of the vehicle, other electric retractable rear-view devices for a vehicle and electric retractable view devices for a vehicle for purposes other than a rear view purpose, instead of applying this invention to a door mirror. An electric retractable rear view camera for a vehicle can be formed as, for example, one obtained by forming the visor 14 in FIG. 2 so as to have a small size and, instead of the mirror plate, mounting a camera in the visor 14 in such a manner that an optical axis of the camera faces the rear side of the vehicle when the visor 14 is in a use position.

The invention claimed is:

1. An electric retractable view device for a vehicle, the view device comprising:
    a shaft provided upright on a vehicle body side;
    a rotating body supported by the shaft so as to be rotatable in a direction around an axis of the shaft;
    a motor mounted in the rotating body;
    a power transmission mechanism that transmits a driving force of the motor to the shaft to rotate the rotating body in the direction around the axis of the shaft, wherein
    the rotating body includes a motor holding member that holds a motor body of the motor, the rotating body includes a cover put on the motor holding member, and the cover includes a retainer at an inner circumferential surface of the cover,
    the motor holding member includes a barrel and a claw engagement piece,
    the barrel includes an inner space that receives the motor body and an open end of the inner space, and the barrel has a configuration that causes the motor body to enter the inner space from the open end, with a side on which a motor shaft protrudes as a top side, and be thereby received in the inner space and causes rotation of the motor shaft to be output to an outside of the inner space,
    the claw engagement piece includes a leg disposed so as to face the inner space, the leg including a fixed end disposed on a deep side in an axis direction of the inner space of the barrel and a free end disposed on the open end side, and an engagement claw disposed at the leg so as to face the inner space side, and the claw engagement piece has a configuration that causes an engagement surface of the engagement claw to be engaged with an engaged portion of the motor body received in the barrel to lock the motor so as to prevent axial movement, and
    the engagement surface of the engagement claw is disposed at a position on a deeper side of the inner space relative to the open end of the inner space; and
    the retainer being in abutment with the claw engagement piece and thereby locking the claw engagement piece so as to prevent spreading toward an outside of the barrel.

2. The electric retractable view device for a vehicle according to claim 1, wherein:
    the barrel includes two cutouts at two positions in a circumferential direction of the barrel, the cutouts being formed in communication with the open end of the inner space; and
    the claw engagement piece includes a part of the barrel, the part being circumferentially separated from the barrel by the two cutouts, as the leg.

3. The electric retractable view device for a vehicle according to claim 1, wherein a distal end of the free end of the claw engagement piece is disposed at a position aligned with the open end of the inner space or a position on the inner space, and the position on the inner space being at a depth from the open end.

4. The electric retractable view device for a vehicle according to claim 1, wherein a width of the leg of the claw engagement piece is larger than a width of the engagement claw of the claw engagement piece in a circumferential direction of the motor body.

5. An electric retractable view device for a vehicle, the view device comprising:
    a shaft provided upright on a vehicle body side;
    a rotating body supported by the shaft so as to be rotatable in a direction around an axis of the shaft;
    a motor mounted in the rotating body; and
    a power transmission mechanism that transmits a driving force of the motor to the shaft to rotate the rotating body in the direction around the axis of the shaft, wherein
    the rotating body includes a motor holding member that holds a motor body of the motor,
    the motor holding member includes a barrel and a claw engagement piece,
    the barrel includes an inner space that receives the motor body and an open end of the inner space, and the barrel has a configuration that causes the motor body to enter the inner space from the open end, with a side on which a motor shaft protrudes as a top side, and be thereby received in the inner space and causes rotation of the motor shaft to be output to an outside of the inner space,
    the claw engagement piece includes a leg disposed so as to face the inner space, the leg including a fixed end disposed on a deep side in an axis direction of the inner space of the barrel and a free end disposed on the open end side, and an engagement claw disposed at the leg so as to face the inner space side, and the claw engagement piece has a configuration that causes an engagement surface of the engagement claw to be engaged with an engaged portion of the motor body received in the barrel to lock the motor so as to prevent axial movement, and the engagement surface of the engagement claw is disposed at a position on a deeper side of the inner space relative to the open end of the inner space wherein:
  a width of the leg of the claw engagement piece is larger than a width of the engagement claw of the claw engagement piece in a circumferential direction of the motor body;
  the engagement claw of the claw engagement piece is disposed in a center in the width direction of the leg; and
  the leg includes an opening in a surface of the leg, the opening being located at a position at which the opening faces the engagement surface.

6. The electric retractable view device for a vehicle according to claim 5, wherein:
  the barrel includes two cutouts at two positions in a circumferential direction of the barrel, the cutouts being formed in communication with the open end of the inner space; and
  the claw engagement piece includes a part of the barrel, the part being circumferentially separated from the barrel by the two cutouts, as the leg.

7. The electric retractable view device for a vehicle according to claim 5, wherein a distal end of the free end of the claw engagement piece is disposed at a position aligned with the open end of the inner space or a position on the inner space, and the position on the inner space being at a depth from the open end.

8. The electric retractable view device for a vehicle according to claim 5, wherein:
  the rotating body includes a cover put on the motor holding member; and
  the cover includes a retainer at an inner circumferential surface of the cover, the retainer being in abutment with the claw engagement piece and thereby locking the claw engagement piece so as to prevent spreading toward an outside of the barrel.

* * * * *